United States Patent
Glenn et al.

(10) Patent No.: US 12,472,232 B2
(45) Date of Patent: Nov. 18, 2025

(54) METHODS TO TREAT VIRAL INFECTIONS

(71) Applicant: The Board of Trustees of the Leland Stanford Junior University, Stanford, CA (US)

(72) Inventors: Jeffrey S. Glenn, Stanford, CA (US); Edward A. Pham, Palo Alto, CA (US); Anming Xiong, Redwood City, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 408 days.

(21) Appl. No.: 17/617,267

(22) PCT Filed: Jun. 9, 2020

(86) PCT No.: PCT/US2020/036805
§ 371 (c)(1),
(2) Date: Dec. 7, 2021

(87) PCT Pub. No.: WO2020/251941
PCT Pub. Date: Dec. 17, 2020

(65) Prior Publication Data
US 2022/0347263 A1    Nov. 3, 2022

Related U.S. Application Data

(60) Provisional application No. 62/860,533, filed on Jun. 12, 2019.

(51) Int. Cl.
*A61K 38/00* (2006.01)
*A61K 38/17* (2006.01)
*A61K 38/21* (2006.01)
*A61P 31/20* (2006.01)

(52) U.S. Cl.
CPC ............ *A61K 38/177* (2013.01); *A61K 38/21* (2013.01); *A61P 31/20* (2018.01)

(58) Field of Classification Search
CPC .................. A61K 38/177; A61K 38/21; A61K 2039/505; A61P 31/20; A61P 31/12; C07K 2317/31
See application file for complete search history.

(56) References Cited

U.S. PATENT DOCUMENTS

| | | |
|---|---|---|
| 2007/0078187 A1 | 4/2007 | McGrath et al. |
| 2010/0166649 A1 | 7/2010 | Shin |
| 2011/0293610 A1 | 12/2011 | Ruben et al. |
| 2018/0282386 A1 | 10/2018 | Vallera et al. |
| 2019/0038685 A1 | 2/2019 | Alexander et al. |

OTHER PUBLICATIONS

Chen et al. (2004) Proc. West. Pharmacol. Soc. 47: 28-29.*
Li, et al. "CD24 polymorphisms affect risk and progression of chronic hepatitis B virus infection." *Hepatology* 50.3 (2009): 735-742.
Tan et al. (2018) "Saliva as a source of reagent to study human susceptibility to avian influenza H7N9 virus infection". Emerging Microbes & Infections. pp. 1-10.
Aksoy et al. (2014) "HPV16 infection of HaCaTs is dependent on beta4 integrin, and alpha6 integrin processing". Virology, vol. 449, pp. 45-52.
Schnell et al., "Potent anti-tumor effects of an anti-CD24 ricin A-chain immunotoxin in vitro and in a disseminated human Burkitt's lymphoma model in SCID mice" *International Journal of Cancer* 66:4 (1996): 526-531.

* cited by examiner

*Primary Examiner* — Jeanette M Lieb
(74) *Attorney, Agent, or Firm* — Pamela J. Sherwood; Bozicevic, Field & Francis LLP

(57) ABSTRACT

Methods and compositions are provided for reducing virus titer and eliminating virus-infected cells from an individual.

19 Claims, 3 Drawing Sheets
Specification includes a Sequence Listing.

SEQUENCE LISTING

```
<160> NUMBER OF SEQ ID NOS: 7

<210> SEQ ID NO 1
<211> LENGTH: 19
<212> TYPE: DNA
<213> ORGANISM: Artificial sequence
<220> FEATURE:
<223> OTHER INFORMATION: synthetic sequence

<400> SEQUENCE: 1
agtgtggatt cgcactcct                                                19

<210> SEQ ID NO 2
<211> LENGTH: 23
<212> TYPE: DNA
<213> ORGANISM: Artificial sequence
<220> FEATURE:
<223> OTHER INFORMATION: synthetic sequence

<400> SEQUENCE: 2
gagttcttct tctaggggac ctg                                           23
```

<210> SEQ ID NO 3
<211> LENGTH: 29
<212> TYPE: DNA
<213> ORGANISM: Artificial sequence
<220> FEATURE:
<223> OTHER INFORMATION: synthetic sequence

<400> SEQUENCE: 3
ccaaatgccc ctatcttatc aacacttcc                                29

<210> SEQ ID NO 4
<211> LENGTH: 19
<212> TYPE: DNA
<213> ORGANISM: Artificial sequence
<220> FEATURE:
<223> OTHER INFORMATION: synthetic sequence

<400> SEQUENCE: 4
ggtcggcatg gcatctcca                                           19

<210> SEQ ID NO 5
<211> LENGTH: 20
<212> TYPE: DNA
<213> ORGANISM: Artificial sequence
<220> FEATURE:
<223> OTHER INFORMATION: synthetic sequence

<400> SEQUENCE: 5
ggcwctccct tagccatccg                                          20

<210> SEQ ID NO 6
<211> LENGTH: 19
<212> TYPE: DNA
<213> ORGANISM: Artificial sequence
<220> FEATURE:
<223> OTHER INFORMATION: synthetic sequence

<400> SEQUENCE: 6
ggtcggcatg gcatctcca                                           19

<210> SEQ ID NO 7
<211> LENGTH: 24
<212> TYPE: DNA
<213> ORGANISM: Artificial sequence
<220> FEATURE:
<223> OTHER INFORMATION: synthetic sequence

<400> SEQUENCE: 7
ctcctwcgga tgcccaggtc ggac                                     24

METHODS TO TREAT VIRAL INFECTIONS

CROSS REFERENCE

This application claims benefit of PCT Application PCT/US2020/036805, filed Jun. 9, 2020, which claims benefit of U.S. Provisional Patent Application No. 62/860,533, filed Jun. 12, 2019, which applications are incorporated herein by reference in their entirety.

INTRODUCTION

Viral infections are a major cause of worldwide morbidity and mortality. For many of these viruses current therapies are inadequate or non-existent. For example, hepatitis B virus (HBV) infects over 300 million people worldwide, in spite of the existence of an effective vaccine. Moreover, current treatments for HBV are unable to completely remove the virus from the liver where among other things the virus integrates into the human genome. Such integrated and persistent HBV infection is a major risk factor for chronic hepatitis, liver cirrhosis, liver cancer, and premature death.

At present, current therapies are largely unable to eradicate chronic HBV infection. The goal of eliminating HBV surface antigen (HBsAg), which helps thwart the host's immune response to HBV, is very rarely achieved, and if so only occurs after years of treatment. Methods of treatment are of great interest.

SUMMARY

Methods are provided for significantly reducing and in some instances eliminating virus-infected cells in an individual by administering to the individual a therapeutically effective dose of an anti-CD24 agent for a period of time sufficient to substantially reduce the amount of virus and in some instances eliminate the virus-infected cells in that individual. In some embodiments the virus is a virus that causes chronic infection, for example by integrating into the host genome. In some embodiments the virus is a chronic hepatitis virus, e.g. hepatitis B, hepatitis C, hepatitis D. In some embodiments the virus is a lentivirus, e.g. HIV-1, HIV-2. In some embodiments the virus is a human papilloma virus (HPV). In some embodiments the virus is a herpesvirus, e.g. herpes simplex virus (HSV), human cytomegalovirus (CMV), Epstein-Barr virus (EBV), Varicella Zoster Virus (VZV), HHV-8, etc.

The anti-CD24 agent may specifically bind to CD24 and block its activity, e.g. by blocking binding to one of its ligands, e.g. P-selectin, siglec10, etc. Agents that specifically bind to CD24 include, without limitation, antibodies and fragments derived therefrom; non-antibody-binding proteins such as adnectins and anticalins, etc., peptides that bind at high affinity; nucleic acids that bind at high affinity, small molecules, etc. CD24 expression can also be reduced with CRISPR, siRNA, or locked nucleic acid (LNA) targeting CD24. Alternatively an anti-CD24 agent may specifically bind to, and block, a ligand of CD24. The binding of CD24 to Siglec-10, which is present on B cells, dendritic cells (DCs), macrophages, and neutrophils leads to immune response dampening, a "leave-me-alone" or "don't kill me" signal. The upregulation of CD24 by HBV and other chronic viral infections may allow infected cells to evade the immune response which results in viral persistence and in a percentage of cases, subsequent cancer formation.

It is shown herein that doses of anti-CD24 antibody of greater than about 8 mg/kg can result in rapid overt clinical toxicity, followed by death. Surprisingly, a much lower range of doses for anti-CD24 antibody can significantly reduce, and in some instances eradicate presence of a chronic virus, including without limitation HBV, under conditions that do not cause substantial toxicity to uninfected cells. In some embodiments treatment results in undetectable levels of virus antigen, e.g. HBsAg, in blood of the infected individual. In some embodiments the level of circulating virus antigen, e.g. HBsAg, is reduced by at least one log relative to the baseline pre-treatment levels; and may be reduced at least 1 log, at least 2 logs, at least 3 logs, or more. In some embodiments the individual achieves, following treatment, seroconversion to an anti-HBsAg positive phenotype. In some embodiments the individual is tested for levels of virus antigen and/or anti-virus antibodies following treatment. These data show that there may be unacceptable toxicity for therapeutic use of anti-CD24 antibody at doses above greater than about 8 mg/kg.

The effect on uninfected cells, e.g. hepatocytes, may be monitored by release of hepatocyte markers into the blood of a non-infected individual exposed to the agent. It is to be expected that a low level of such markers will be detected from the killing of the infected cells in an infected patient, but that the dose will be sufficiently low that there are no dose limiting toxicities and that elevated levels of such markers are transient. Adverse effects are desirably at a level less than 3, and may be less than 2, or less than 1, using conventional criteria, e.g. CDCAE v 5. Importantly, not all the hepatocytes in an HBV infected individual are infected with HBV, and the liver can be repopulated with uninfected cells. Thus, selectively removing the HBV infected cells can be of significant clinical benefit. In some embodiments an individual is tested for adverse effect following treatment.

Benefits of the methods may include, for example, rapid and controlled loss of circulating virus antigens, killing and removal of infected cells, a short treatment course, and convenient dosing schedule. For example, the treatment course may be less than 24 weeks, less than about 12 weeks, less than about 8 weeks, less than about 4 weeks, and may be, for example, from 1-12 weeks, from 2-12 weeks, from 4-12 weeks, from 4-8 weeks, etc. Administration may be once a week, twice a week, every other day, daily, every two weeks, etc., and in some embodiments is once a week, or once every two or four weeks. In some embodiments, more than one course of treatment is given.

In some embodiments the anti-CD24 agent is an antibody specific for human CD24, which optionally is a humanized or fully human monoclonal antibody. In some embodiments an anti-CD24 antibody is administered at a dose of less than 8 mg/kg body weight, less than 2.5 mg/kg, less than 1 mg/kg, less than 0.75 mg/kg, less than 0.5 mg/kg, less than 0.25 mg/kg, less than 0.1 mg/kg, less than 0.05 mg/kg, less than 0.01 mg/kg. The therapeutic dose may be, for example, from 0.1 to 5 mg/kg, from 0.25 to 5 mg/kg, from 0.5 to 5 mg/kg, from 0.75 to 5 mg/kg, from 1 to 5 mg/kg; or from 0.1 to 2.5 mg/kg, from 0.25 to 2.5 mg/kg, from 0.5 to 2.5 mg/kg, from 0.7 to 2.5 mg/kg; from 0.1 to 1 mg/kg, from 0.25 to 1 mg/kg, from 0.5 to 1 mg/kg, from 0.75 to 1 mg/kg, etc.

Administration of an anti-CD24 agent may be combined with co-administration of agents preventing re-infection of new cells. Such agents may include, for example, the entry inhibitor myrcludex-b, anti-NTBC antibody, an HBV nucleoside analog (e.g. TDF, TAF, ETC), and the like. Administration of an anti-CD24 agent may be combined with a second anti-viral agent, e.g. HBsAg release inhibitor (nucleic acid polymers), HBV core inhibitors, siRNAs targeting HBV (or HDV), immunodulator (TLR agonists, interferons including alpha or lambda, etc), RT or polymerase inhibitor, a prenylation inhibitor, therapeutic vaccines, and the like.

In other embodiments, administration of an anti-CD24 agent is combined with administration of an agent that specifically targets a second antigen upregulated on virus-infected cells. Markers of interest include, without limitation, CD15, CD104, CD257, CD105, CD133, and CD47. In some embodiments the agent that binds to a second antigen is an antibody. In some embodiments a bispecific antibody that targets CD24 and a second antigen is administered.

In other embodiments, methods are provided for significantly reducing the amount of viruses and in some instances eliminating virus-infected cells in an individual by administering to the individual a therapeutically effective dose of an agent selected from an anti-CD15 agent, an anti CD104 agent, an anti-CD133 agent, an anti-CD257 agent; or a combination thereof, for a period of time sufficient to substantially eliminate the virus-infected cells. In some embodiments the agent is other than an anti-CD47 agent. In some embodiments the virus is a virus that causes chronic infection, for example by integrating into the host genome. In some embodiments the virus is a chronic hepatitis virus, e.g. hepatitis B, hepatitis C, hepatitis D. In some embodiments the virus is a lentivirus, e.g. HIV-1, HIV-2. In some embodiments the virus is a human papilloma virus (HPV). In some embodiments the virus is a herpesvirus, e.g. herpes simplex virus (HSV), human cytomegalovirus (CMV), Epstein-Barr virus (EBV), Varicella Zoster Virus (VZV), HHV-8, etc. Agents that specifically bind to CD15, CD104, CD133, CD47, CD257 include, without limitation, antibodies and fragments derived therefrom; non-antibody-binding proteins such as adnectins and anticalins, etc., peptides that bind at high affinity; nucleic acids that bind at high affinity, small molecules, etc. In some embodiments the agent is an antibody. An anti-CD15 agent may specifically bind to CD15 and block its activity, e.g. by blocking binding to one of its ligands, e.g. P-selectin, CD43, CD44, etc. CD15, CD24, CD47, CD104, CD105, CD133, CD257 expression can also be reduced with CRISPR, siRNA, or locked nucleic acid (LNA), or any antisense oligonucleotides with or without chemically modified nucleotides/nucleosides targeting them. CD15 expression can further be reduced by agents that target its host synthetic enzymes such as the fucosyltransferases FUT3, FUT5, FUT6, FUT7 and/or the sialyltransferase ST3GAL3, ST3GAL4, and ST3GAL6.

In some embodiments an antibody that binds to a marker selected from CD15, CD104, CD257, CD105, CD133, and CD47 and blocks the binding of the marker to one of its ligands is administered at a dose of less than 40 mg/kg body weight, less than 35 mg/kg body weight, less than 30 mg/kg body weight, less than 25 mg/kg body weight, less than 20 mg/kg body weight, less than 15 mg/kg body weight, less than 10 mg/kg body weight, less than 5, mg/kg body weight, less than 2.5 mg/kg, less than 1 mg/kg, less than 0.75 mg/kg, less than 0.5 mg/kg, less than 0.25 mg/kg, less than 0.1 mg/kg, less than 0.05 mg/kg, less than 0.01 mg/kg. The therapeutic dose may be, for example, from 0.1 to 5 mg/kg, from 0.25 to 5 mg/kg, from 0.5 to 5 mg/kg, from 0.75 to 5 mg/kg, from 1 to 5 mg/kg; or from 0.1 to 2.5 mg/kg, from 0.25 to 2.5 mg/kg, from 0.5 to 2.5 mg/kg, from 0.7 to 2.5 mg/kg; from 0.1 to 1 mg/kg, from 0.25 to 1 mg/kg, from 0.5 to 1 mg/kg, from 0.75 to 1 mg/kg, 1 to 5 mg/kg, 5 to 10 mg/kg, 10 to 20 mg/kg, 20 to 30 mg/kg, 30 to 40 mg/kg etc.

In other embodiments a composition for use in any of the methods described herein is provided, e.g. an anti-CD24 agent, which may be provided in an effective unit dose, alone or in combination with a second active agent as described above. In some embodiments an anti-CD15 agent, an anti CD104 agent, an anti-CD133 agent, an anti-CD47 agent, an anti-CD257 agent; or a combination thereof, is provided in an effective unit use for use in the methods described herein.

BRIEF DESCRIPTION OF THE DRAWINGS

The invention is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity. Included in the drawings are the following figures.

FIG. 2B. Anti-CD24. FIG. 2C. Anti-CD15. FIG. 2D. Anti-CD47. FIG. 2E. Anti-CD104. FIG. 2F. Anti-CD133. FIG. 2G. Anti-CD257.

DETAILED DESCRIPTION

Figure 1:
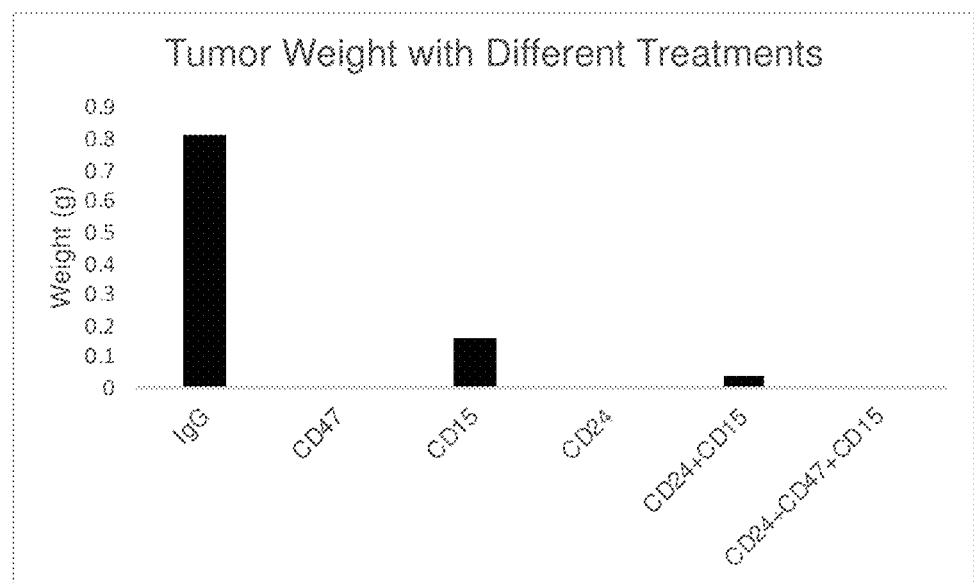
FIG. 1. Anti-CD24 and anti-CD15 prevent tumor formation of HBV infected cells.
Figure 2A:
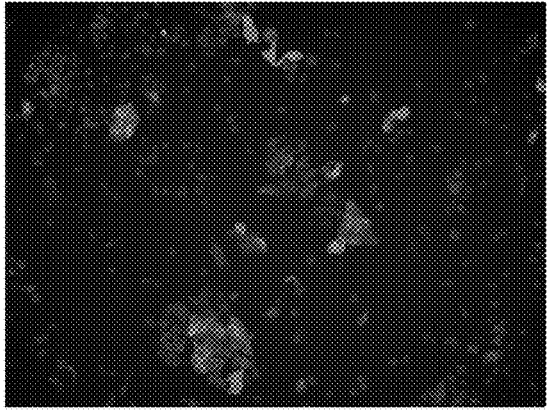
FIG. 2A-G. Monoclonal antibodies mediated phagocytic clearance of HBV cell line (HepG2.2.15). HepG2.2.15 cells were labeled with mCherry (Red) by transduced with lentiviral vector containing mCherry gene under PGK promoter. Raw 264.7 cells were cultured in IMDM medium with 10% FBS, activated by 50 nM phorbol 12-myristate 13-acetate (PMA, Sigma-Aldrich) and 10 ng/ml of M-CSF. After two days of activation, Raw264.7 were detached and labeled with 0.1 mM of Calcein AM (Green) on 37° C. for 30 min. Both the labeled HepG2.2.15 and Raw264.7 cells were mixed as ratio 1:10, seeded on 8-well chamber slides and quickly attached by low speed centrifuge for 5 min. Cells were then cultured in IMDM with 50 nM PMA and 10 ng/ml of pigment epithelium-derived factor (PEDF). The indicated antibody was added to each well to final concentration $10^{-20}$ g/ml. After 24 hrs of coculture, cells were washed three times with PBS and mounted on antifade media containing DAPI. The images were captured with a KEYENCE BZ-X710 All-in-One Fluorescence Microscope (KEYENCE Corp. of USA, Itasca, IL, USA). Antibodies each panel are FIG. 2A. IgG2a negative control.
Figure 2B:
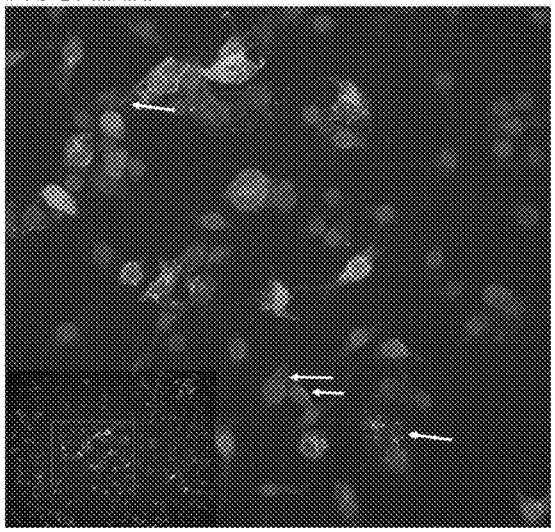
Figure 2C:
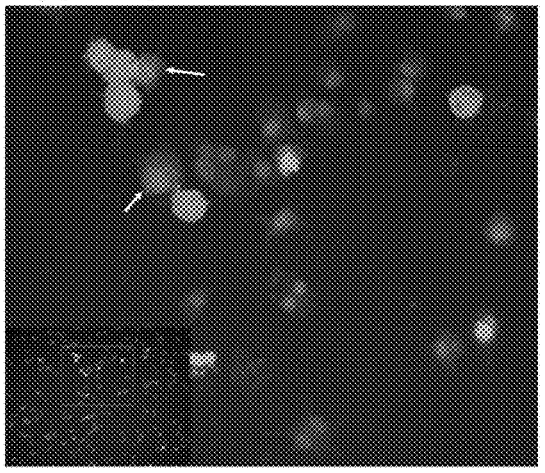
Figure 2D:
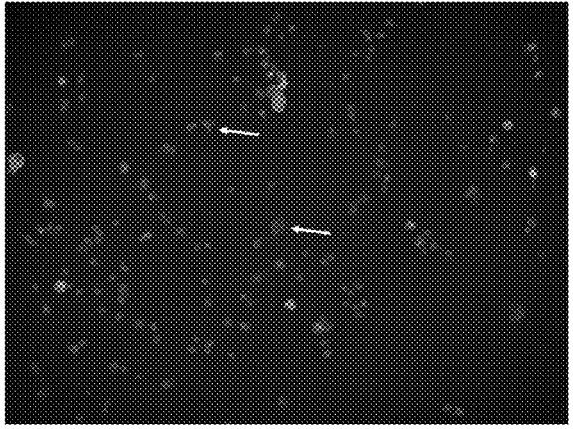
Figure 2E:
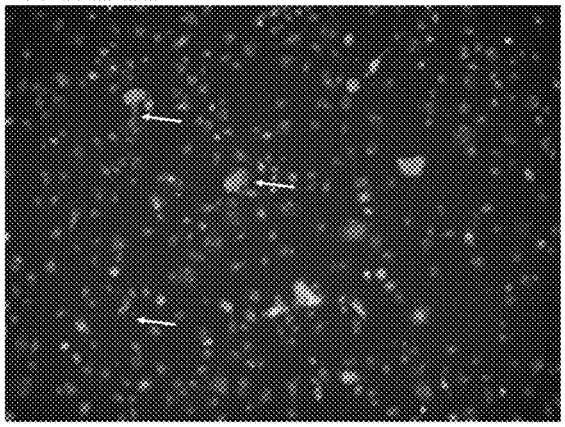
Figure 2F:
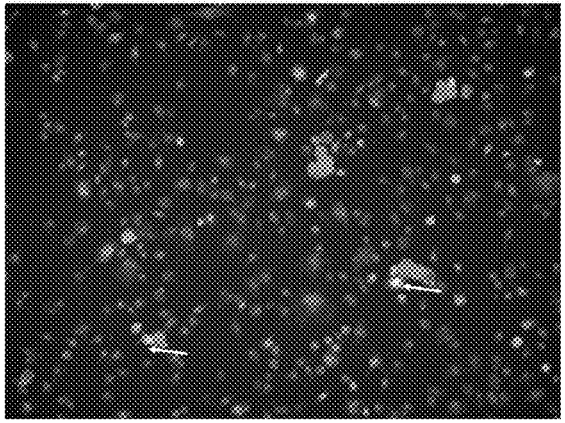
Figure 2G:
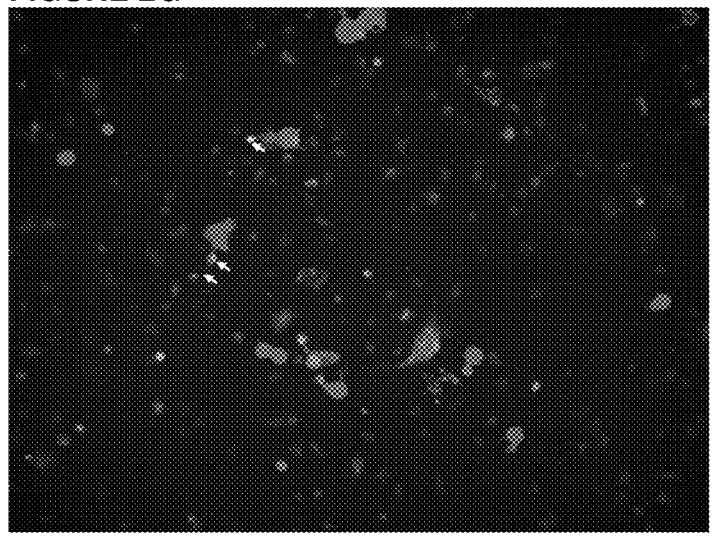

It is shown herein that HBV infection is associated with increased expression of host cell CD24 on the cell surface. Treatment of an in vivo model for human livers infected with HBV using a monoclonal antibody against human CD24 led to rapid decline in HBV titers and significant reduction and in some instances elimination of HBV surface antigen (HBsAg). Current therapies can suppress extrachromosomal replication of HBV but leave HBV-infected cells intact with integrated genomes producing large quantities of immune-suppressing HBsAg expression. In some instances, treatment with anti-CD24 led to killing of HBV-infected cells which eliminates all traces of HBV infection, removing the infection-promoting integrated HBV, and disappearance of the immune-suppressing HBsAg. In some instances, the methods provide for actual removal of HBV-infected cells, with minimal damage on uninfected liver cells.

Other markers that also affect phagocytosis of virus infected cells include CD15, CD104, CD133, CD47, CD257. Blocking these markers on the surface of infected cells increases phagocytosis.

Before the present methods and compositions are described, it is to be understood that this invention is not limited to particular method or composition described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed within the invention. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, some potential and preferred methods and materials are now described. All publications mentioned herein are incorporated herein by reference to disclose and describe the methods and/or materials in connection with which the publications are cited. It is understood that the present disclosure supersedes any disclosure of an incorporated publication to the extent there is a contradiction.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

It must be noted that as used herein and in the appended claims, the singular forms "a", "an", and "the" include plural referents unless the context clearly dictates otherwise. Thus, for example, reference to "a cell" includes a plurality of such cells and reference to "the peptide" includes reference to one or more peptides and equivalents thereof, e.g. polypeptides, known to those skilled in the art, and so forth.

The publications discussed herein are provided solely for their disclosure prior to the filing date of the present application. Nothing herein is to be construed as an admission that the present invention is not entitled to antedate such publication by virtue of prior invention. Further, the dates of publication provided may be different from the actual publication dates which may need to be independently confirmed.

In the description that follows, a number of terms conventionally used in the field are utilized. In order to provide a clear and consistent understanding of the specification and claims, and the scope to be given to such terms, the following definitions are provided.

The terms "polypeptide," "peptide" and "protein" are used interchangeably herein to refer to a polymer of amino acid residues. The terms also apply to amino acid polymers in which one or more amino acid residue is an artificial chemical mimetic of a corresponding naturally occurring amino acid, as well as to naturally occurring amino acid polymers and non-naturally occurring amino acid polymer.

The term "amino acid" refers to naturally occurring and synthetic amino acids, as well as amino acid analogs and amino acid mimetics that function in a manner similar to the naturally occurring amino acids. Naturally occurring amino acids are those encoded by the genetic code, as well as those amino acids that are later modified, e.g., hydroxyproline, gamma-carboxyglutamate, and O-phosphoserine. Amino acid analogs refer to compounds that have the same basic chemical structure as a naturally occurring amino acid, i.e., an .alpha. carbon that is bound to a hydrogen, a carboxyl group, an amino group, and an R group, e.g., homoserine, norleucine, methionine sulfoxide, methionine methyl sulfonium. Such analogs have modified R groups (e.g., norleucine) or modified peptide backbones, but retain the same basic chemical structure as a naturally occurring amino acid. Amino acid mimetics refers to chemical compounds that have a structure that is different from the general chemical structure of an amino acid, but that functions in a manner similar to a naturally occurring amino acid.

The terms "recipient", "individual", "subject", "host", and "patient", are used interchangeably herein and refer to any mammalian subject for whom diagnosis, treatment, or therapy is desired, particularly humans. "Mammal" for purposes of treatment refers to any animal classified as a mammal, including humans, domestic and farm animals, and zoo, sports, or pet animals, such as dogs, horses, cats, cows, sheep, goats, pigs, etc. In some embodiments, the mammal is human.

The term "sample" with respect to a patient encompasses blood and other liquid samples of biological origin, solid tissue samples such as a biopsy specimen or tissue cultures or cells derived therefrom and the progeny thereof. The definition also includes samples that have been manipulated in any way after their procurement, such as by treatment with reagents; washed; or enrichment for certain cell populations. The definition also includes sample that have been enriched for particular types of molecules, e.g., nucleic acids, polypeptides, etc.

The term "biological sample" encompasses a clinical sample, and also includes tissue obtained by surgical resection, tissue obtained by biopsy, cells in culture, cell supernatants, cell lysates, tissue samples, organs, bone marrow, blood, plasma, serum, aspirate, and the like. A "biological sample" includes a sample comprising target cells and/or normal control cells, or is suspected of comprising such cells. The definition includes biological fluids derived therefrom (e.g., infected cell, etc.), e.g., a sample comprising polynucleotides and/or polypeptides that is obtained from such cells (e.g., a cell lysate or other cell extract comprising polynucleotides and/or polypeptides). A biological sample comprising an infected cell, etc. from a patient can also include non-infected cells.

The term "diagnosis" is used herein to refer to the identification of a molecular or pathological state, disease or condition.

The term "prognosis" is used herein to refer to the prediction of the likelihood of disease progression (e.g., progression of an infection, etc.), including recurrence, drug resistance, etc.

The term "prediction" is used herein to refer to the act of foretelling or estimating, based on observation, experience, or scientific reasoning. In one example, a physician may predict the likelihood that a patient will survive.

The terms "specific binding," "specifically binds," and the like, refer to non-covalent or covalent preferential binding to a molecule relative to other molecules or moieties in a solution or reaction mixture (e.g., an antibody specifically binds to a particular polypeptide or epitope relative to other available polypeptides/epitopes). In some embodiments, the affinity of one molecule for another molecule to which it specifically binds is characterized by a $K_D$ (dissociation constant) of $10^{-5}$ M or less (e.g., $10^{-6}$ M or less, $10^{-7}$ M or less, $10^{-8}$ M or less, $10^{-9}$ M or less, $10^{-10}$ M or less, $10^{-11}$ M or less, $10^{-12}$ M or less, $10^{-13}$ M or less, $10^{-14}$ M or less, $10^{-15}$ M or less, or $10^{-16}$ M or less). "Affinity" refers to the strength of binding, increased binding affinity being correlated with a lower $K_D$.

The term "specific binding member" as used herein refers to a member of a specific binding pair (i.e., two molecules, usually two different molecules, where one of the molecules, e.g., a first specific binding member, through non-covalent means specifically binds to the other molecule, e.g., a second specific binding member).

Anti-CD24 agent. The CD24 gene is located on human chromosome 6q21 and codes for two isoforms of protein: CD24A and CD24B. CD24B (129aa) has a longer distinct N-terminus than CD24A (83aa). CD24A is predominant isoform in HCC and plays a major role in cell proliferation, migration, and invasion. Commercially available antibodies e.g. ML5 and SWA11, target the shared amino acid sequences, and thus do not distinguish between CD24A and CD24B isoforms, although in some embodiments an antibody may be selected that is isoform specific, e.g. for CD24A or CD24B.

CD24 is a glycosylphosphatidylinositol (GPI)-anchored glycoprotein expressed at multiple stages of B-cell development, beginning with the bone marrow pro-B-cell compartment and continuing through mature, surface Ig positive B-cells. Plasma cell expression is very low or negative. It is also expressed on the majority of B-lineage acute lymphoblastic leukemias, B-cell CCLs and B-cell non-Hodgkin's lymphomas. CD24 may play a role in regulation of B-cell proliferation and maturation. Protein references sequences include Genbank NP_001278666; NP_001278667; NP_001278668; NP_037362; NP_001346013. Antibodies known to bind to human CD24 are known and commercially available, including, without limitation, SWA11 (Creative Biolab); MA5-11833; 12-0247-42; anti-CD24 clone ML5 (Biolegend), SN3 A5-2H10 (also referred to as SN3); ALB9, EPR19925; EPR3006(N); SWA21; SWA22; OKB2, etc. An anti-CD24 agent may include, for example, an antibody that binds to human CD24, such as SWA11 or ML5. An anti-CD24 antibody may bind, for example, the LAP (leucine-alanine-proline) motif, as is known in the art. Alternatively, an antibody may be generated that is specific for human CD24. Humanized anti-CD24 antibodies known in the art include, for example, those described by Weber et al, Clinical Exp Immunol, 1993; Shapira et al. in: Proceedings of the 107th Annual Meeting of the American Association for Cancer Research; 2016 Apr. 16-20; New Orleans, LA. Philadelphia (PA): AACR; Cancer Res 2016; 76(14 Suppl): Abstract nr 3805 and Sun et al. (2017) Oncotarget Vol. 8, (No. 31), pp: 51238-51252, each herein specifically incorporated by reference. Humanized anti-CD24 antibodies include, for example, humanized SWA11 antibody (as described in Arber U.S. Pat. No. 8,614,301 B2), and a humanized anti-CD24 antibody as described in CN103819561A.

CD24 is a heavily glycosylated surface glycophosphatidylinositol (GPI)-anchored protein, As lack of intracellular signaling domains, it was believed that CD24 modulates other signal transduction pathways indirectly, through interacting with cir- or trans-cell surface receptors. CD24 may have a pivotal role in cell differentiation and stress response of different cell types. Signaling could be triggered by the binding of a lectin-like ligand to the CD24 carbohydrates, and transduced by the release of second messengers derived from the GPI-anchor or associated molecules. In association with Siglec10, CD24 may be involved in the selective suppression of the immune response to danger-associated molecular patterns (DAMPs) such as HMGB1, HSP70 and HSP90. CD24 also binds to P-selectin.

As used herein, the term "anti-CD24 agent" refers to any agent that binds to and blocks or inactivates, or impairs the function of, CD24 on the surface of a virus-infected cell. In some embodiments, a suitable anti-CD24 agent (e.g. an anti-CD24 antibody, a peptide, etc.) specifically binds CD24 and reduces the interaction of CD24 to its ligand. In other embodiments an anti-CD24 agent binds to and blocks the interaction of CD24 with P-selectin. In other embodiments an anti-CD24 agent binds to and blocks the interaction of CD24 and siglec10. In some cases, an anti-CD24 agent is an antibody, and in some cases it is a humanized antibody. Small molecule compounds, including peptides, DNA or RNA aptamers, that inhibit the binding of CD24 with one of its ligands are also considered to be anti-CD24 agents.

The efficacy of a suitable anti-CD24 agent can be assessed by assaying the agent. As a non-limiting example of such an assay, target cells are incubated in the presence or absence of the candidate agent, and killing of the target cells is measured. An agent for use in the subject methods (an anti-CD24 agent) will increase cell death by at least 10% (e.g., at least 20%, at least 30%, at least 40%, at least 50%, at least 60%, at least 70%, at least 80%, at least 90%, at least 100%, at least 120%, at least 140%, at least 160%, at least 180%, at least 200%, or at least 300%) compared cell death in the absence of the candidate agent. In addition, an agent for use in the subject methods (an anti-CD24 agent) will decrease the level of HBV surface Ag (in the case of HBV) or other markers of viral infections (such as viral titer) by at least 10% (e.g., at least 20%, at least 30%, at least 40%, at least 50%, at least 60%, at least 70%, at least 80%, at least 90%, at least 100%, at least 120%, at least 140%, at least 160%, at least 180%, at least 200%, or at least 300%) compared with in the absence of the candidate agent.

Anti-CD15 agent. CD15 is a carbohydrate adhesion molecule that mediates phagocytosis and chemotaxis, found on neutrophils; expressed in patients with Hodgkin disease, some B-cell chronic lymphocytic leukemias, acute lymphoblastic leukemias, and most acute nonlymphocytic leukemias. It is also called Lewis x and SSEA-1 (stage specific embryonic antigen 1) and represents a marker for murine pluripotent stem cells, in which it plays an important role in adhesion and migration of the cells in the preimplantation embryo.

An anti-CD15 agent may include, for example, an antibody that binds to human CD15. Alternatively, an antibody may be generated that is specific for human CD15. Antibodies are known in the art, for example Roge et al. (2014) Appl Immunohistochem Mol Morphol. 2014 July; 22(6): 449-58; Pellegrini et al. Haematologica. 2007 May; 92(5): 708-9; Jegatheeswaran et al. J Immunol. 2019 Dec. 1; 203(11):3037-3044; each herein specifically incorporated by reference.

As used herein, the term "anti-CD15 agent" refers to any agent that binds to and blocks or inactivates, or impairs the function of, CD15 on the surface of a virus-infected cell. In some embodiments, a suitable anti-CD15 agent (e.g. an anti-CD15 antibody, a peptide, etc.) specifically binds CD15 and reduces the interaction of CD15 to its ligand. In some cases, an anti-CD15 agent is an antibody, and in some cases it is a humanized antibody. Small molecule compounds, including peptides, DNA or RNA aptamers, that inhibit the binding of CD15 with one of its ligands are also considered to be anti-CD15 agents.

The efficacy of a suitable anti-CD15 agent can be assessed by assaying the agent. As a non-limiting example of such an assay, target cells are incubated in the presence or absence of the candidate agent, and killing of the target cells is measured. An agent for use in the subject methods (an anti-CD15 agent) will increase cell death by at least 10% (e.g., at least 20%, at least 30%, at least 40%, at least 50%, at least 60%, at least 70%, at least 80%, at least 90%, at least 100%, at least 120%, at least 140%, at least 160%, at least 180%, at least 200%, or at least 300%) compared cell death in the absence of the candidate agent. In addition, an agent for use in the subject methods (an anti-CD15 agent) will decrease the level of HBV surface Ag (in the case of HBV) or other markers of viral infections (such as viral titer) by at least 10% (e.g., at least 20%, at least 30%, at least 40%, at least 50%, at least 60%, at least 70%, at least 80%, at least 90%, at least 100%, at least 120%, at least 140%, at least 160%, at least 180%, at least 200%, or at least 300%) compared with in the absence of the candidate agent.

An anti-CD15 agent may specifically bind to CD15 and block its activity, e.g. by blocking binding to one of its ligands, e.g. P-selectin, CD43, CD44, etc. CD15 expression can further be reduced by agents that target its host synthetic enzymes such as the fucosyltransferases FUT3, FUT5, FUT6, FUT7 and/or the sialyltransferase ST3GAL3, ST3GAL4, and ST3GAL6.

Anti-CD104 agent. CD104 (Integrin beta-4 (ITB4)), is encoded by the ITGB4 gene; receptor for laminin; structural role in epithelial cells; required for regulation of keratinocyte polarity and motility. The 1822-amino acid protein cellular localization is predicted to be membrane-associated.

An anti-CD104 agent may include, for example, an antibody that binds to human CD104. Alternatively, an antibody may be generated that is specific for human CD104. Antibodies are known in the art and commercially available from multiple sources.

As used herein, the term "anti-CD104 agent" refers to any agent that binds to and blocks or inactivates, or impairs the function of, CD104 on the surface of a virus-infected cell. In some embodiments, a suitable anti-CD104 agent (e.g. an anti-CD104 antibody, a peptide, etc.) specifically binds CD104 and reduces the interaction of CD104 to its ligand. In some cases, an anti-CD104 agent is an antibody, and in some cases it is a humanized antibody. Small molecule compounds, including peptides, DNA or RNA aptamers, that inhibit the binding of CD104 with one of its ligands are also considered to be anti-CD104 agents.

The efficacy of a suitable anti-CD104 agent can be assessed by assaying the agent. As a non-limiting example of such an assay, target cells are incubated in the presence or absence of the candidate agent, and killing of the target cells is measured. An agent for use in the subject methods (an anti-CD104 agent) will increase cell death by at least 10% (e.g., at least 20%, at least 30%, at least 40%, at least 50%, at least 60%, at least 70%, at least 80%, at least 90%, at least 100%, at least 120%, at least 140%, at least 160%, at least 180%, at least 200%, or at least 300%) compared cell death in the absence of the candidate agent. In addition, an agent for use in the subject methods (an anti-CD104 agent) will decrease the level of HBV surface Ag (in the case of HBV) or other markers of viral infections (such as viral titer) by at least 10% (e.g., at least 20%, at least 30%, at least 40%, at least 50%, at least 60%, at least 70%, at least 80%, at least 90%, at least 100%, at least 120%, at least 140%, at least 160%, at least 180%, at least 200%, or at least 300%) compared with in the absence of the candidate agent.

Anti-CD133 agent. CD133 antigen, also known as prominin-1, is a glycoprotein that in humans is encoded by the PROM1 gene. It is a member of pentaspan transmembrane glycoproteins, which specifically localize to cellular protrusions. When embedded in the cell membrane, the membrane topology of prominin-1 is such that the N-terminus extends into the extracellular space and the C-terminus resides in the intracellular compartment. The protein consists of five transmembrane segments, with the first and second segments and the third and fourth segments connected by intracellular loops while the second and third as well as fourth and fifth transmembrane segments are connected by extracellular loops.

An anti-CD133 agent may include, for example, an antibody that binds to human CD133. Alternatively, an antibody may be generated that is specific for human CD133. Antibodies are known in the art, for example see Glumac et al. Prostate. 2018 September; 78(13):981-991; Wang et al. Mol Pharm. 2019 Nov. 4; 16(11):4582-4593; Schmied et al. Cancers (Basel). 2019 Jun. 7; 11(6):789; each specifically incorporated by reference.

As used herein, the term "anti-CD133 agent" refers to any agent that binds to and blocks or inactivates, or impairs the function of, CD133 on the surface of a virus-infected cell. In some embodiments, a suitable anti-CD133 agent (e.g. an anti-CD133 antibody, a peptide, etc.) specifically binds CD133 and reduces the interaction of CD133 to its ligand. In some cases, an anti-CD133 agent is an antibody, and in some cases it is a humanized antibody. Small molecule compounds, including peptides, DNA or RNA aptamers, that inhibit the binding of CD133 with one of its ligands are also considered to be anti-CD133 agents.

The efficacy of a suitable anti-CD133 agent can be assessed by assaying the agent. As a non-limiting example of such an assay, target cells are incubated in the presence or absence of the candidate agent, and killing of the target cells is measured. An agent for use in the subject methods (an anti-CD133 agent) will increase cell death by at least 10% (e.g., at least 20%, at least 30%, at least 40%, at least 50%, at least 60%, at least 70%, at least 80%, at least 90%, at least 100%, at least 120%, at least 140%, at least 160%, at least 180%, at least 200%, or at least 300%) compared cell death in the absence of the candidate agent. In addition, an agent for use in the subject methods (an anti-CD133 agent) will decrease the level of HBV surface Ag (in the case of HBV) or other markers of viral infections (such as viral titer) by at least 10% (e.g., at least 20%, at least 30%, at least 40%, at least 50%, at least 60%, at least 70%, at least 80%, at least 90%, at least 100%, at least 120%, at least 140%, at least 160%, at least 180%, at least 200%, or at least 300%) compared with in the absence of the candidate agent.

Anti-CD257 agent. CD257 antigen, B-cell activating factor (BAFF) also known as tumor necrosis factor ligand superfamily member 13B is a protein that in humans is encoded by the TNFSF13B gene. BAFF is also known as B Lymphocyte Stimulator (BLyS) and TNF- and APOL-related leukocyte expressed ligand (TALL-1) and the Dendritic cell-derived TNF-like molecule (CD257 antigen; cluster of differentiation 257). This cytokine is a ligand for receptors TNFRSF13B/TACI, TNFRSF17/BCMA, and TNFRSF13C/BAFF-R. This cytokine is expressed in B cell lineage cells, and acts as a potent B cell activator. It has been also shown to play an important role in the proliferation and differentiation of B cells. BAFF is a 285-amino acid long peptide glycoprotein which undergoes glycosylation at residue 124. It is expressed as a membrane-bound type II transmembrane protein on various cell types including monocytes, dendritic cells and bone marrow stromal cells. The transmembrane form can be cleaved from the membrane, generating a soluble protein fragment. BAFF is the natural ligand of three unusual tumor necrosis factor receptors named BAFF-R (BR3), TACI (transmembrane activator and calcium modulator and cyclophilin ligand interactor), and BCMA (B-cell maturation antigen), all of which have differing binding affinities for it. These receptors are expressed mainly on mature B lymphocytes and their expression varies in dependence of B cell maturation (TACI is also found on a subset of T-cells and BCMA on plasma cells). BAFF-R is involved in the positive regulation during B cell development. TACI binds worst since its affinity is higher for a protein similar to BAFF, called a proliferation-inducing ligand (APRIL). BCMA displays an intermediate binding phenotype and will work with either BAFF or APRIL to varying degrees.

An anti-CD257 agent may include, for example, an antibody that binds to human CD257. Alternatively, an antibody may be generated that is specific for human CD257. Antibodies are known in the art and commercially available from multiple sources.

As used herein, the term "anti-CD257 agent" refers to any agent that binds to and blocks or inactivates, or impairs the function of, CD257 on the surface of a virus-infected cell. In some embodiments, a suitable anti-CD257 agent (e.g. an anti-CD257 antibody, a peptide, etc.) specifically binds CD257 and reduces the interaction of CD257 to its ligand. In some cases, an anti-CD257 agent is an antibody, and in some cases it is a humanized antibody. Small molecule compounds, including peptides, DNA or RNA aptamers, that inhibit the binding of CD257 with one of its ligands are also considered to be anti-CD257 agents.

The efficacy of a suitable anti-CD257 agent can be assessed by assaying the agent. As a non-limiting example of such an assay, target cells are incubated in the presence or absence of the candidate agent, and killing of the target cells is measured. An agent for use in the subject methods (an anti-CD257 agent) will increase cell death by at least 10% (e.g., at least 20%, at least 30%, at least 40%, at least 50%, at least 60%, at least 70%, at least 80%, at least 90%, at least 100%, at least 120%, at least 140%, at least 160%, at least 180%, at least 200%, or at least 300%) compared cell death in the absence of the candidate agent. In addition, an agent for use in the subject methods (an anti-CD257 agent) will decrease the level of HBV surface Ag (in the case of HBV) or other markers of viral infections (such as viral titer) by at least 10% (e.g., at least 20%, at least 30%, at least 40%, at least 50%, at least 60%, at least 70%, at least 80%, at least 90%, at least 100%, at least 120%, at least 140%, at least 160%, at least 180%, at least 200%, or at least 300%) compared with in the absence of the candidate agent.

The term "antibody" herein is used in the broadest sense and specifically covers monoclonal antibodies, polyclonal antibodies, monomers, dimers, multimers, multispecific antibodies (e.g., bispecific antibodies), heavy chain only antibodies, three chain antibodies, single chain Fv, single domain antibodies, nanobodies, etc., and also include antibody fragments with or without pegylation, so long as they exhibit the desired biological activity (Miller et al (2003) Jour. of Immunology 170:4854-4861). Antibodies may be murine, human, humanized, chimeric, or derived from other species. Antibodies, also referred to as immunoglobulins, conventionally comprise at least one heavy chain and one light, where the amino terminal domain of the heavy and light chains is variable in sequence, hence is commonly referred to as a variable region domain, or a variable heavy (VH) or variable light (VL) domain. The two domains conventionally associate to form a specific binding region.

A "functional" or "biologically active" antibody or antigen-binding molecule is one capable of exerting one or more of its natural activities in structural, regulatory, biochemical or biophysical events. For example, a functional antibody or other binding molecule may have the ability to specifically bind an antigen and the binding may in turn elicit or alter a cellular or molecular event such as signaling transduction or phagocytosis. A functional antibody may also block ligand activation of a receptor or act as an agonist or antagonist or as an allosteric modulator.

The term antibody may reference a full-length heavy chain, a full length light chain, an intact immunoglobulin molecule; or an immunologically active portion of any of these polypeptides, i.e., a polypeptide that comprises an antigen binding site that immunospecifically binds an antigen of a target of interest or part thereof, such targets including but not limited to, infection cell or cells that produce autoimmune antibodies associated with an autoimmune disease. The immunoglobulin disclosed herein may comprise any suitable Fc region, including without limitation, human or other mammalian, e.g. cynomogulus, IgG, IgE, IgM, IgD, IgA, IgG1, IgG2, IgG3, IgG4, IgA1 and IgA2 or subclass of immunoglobulin molecule, including hybrid Igs, hybrid Fcs, and engineered subclasses with altered Fc portions that provide for reduced or enhanced effector cell activity. The immunoglobulins can be derived from any species.

The term "variable" refers to the fact that certain portions of the variable domains differ extensively in sequence among antibodies and are used in the binding and specificity of each particular antibody for its particular antigen. However, the variability is not evenly distributed throughout the variable domains of antibodies. It is concentrated in three segments called hypervariable regions both in the light chain and the heavy chain variable domains. The more highly conserved portions of variable domains are called the framework regions (FRs). The variable domains of native heavy and light chains each comprise four FRs, largely adopting a beta-sheet configuration, connected by three hypervariable regions, which form loops connecting, and in some cases forming part of, the beta-sheet structure. The hypervariable regions in each chain are held together in close proximity by the FRs and, with the hypervariable regions from the other chain, contribute to the formation of the antigen-binding site of antibodies (see Kabat et al (1991) Sequences of Proteins of Immunological Interest, 5th Ed. Public Health Service, National Institutes of Health, Bethesda, Md.). The constant domains are not involved directly in binding an antibody to an antigen, but exhibit various effector functions, such as participation of the antibody in antibody dependent cellular cytotoxicity (ADCC).

The term "hypervariable region" when used herein refers to the amino acid residues of an antibody which are responsible for antigen-binding. The hypervariable region may comprise amino acid residues from a "complementarity determining region" or "CDR", and/or those residues from a "hypervariable loop". "Framework Region" or "FR" residues are those variable domain residues other than the hypervariable region residues as herein defined.

The term "monoclonal antibody" as used herein refers to an antibody obtained from a population of substantially homogeneous antibodies, i.e., the individual antibodies comprising the population are identical except for possible naturally occurring mutations that may be present in minor amounts. Monoclonal antibodies are highly specific, being directed against a single antigenic site. Furthermore, in contrast to polyclonal antibody preparations, which include different antibodies directed against different determinants (epitopes), each monoclonal antibody is directed against a single determinant on the antigen. In addition to their specificity, the monoclonal antibodies are advantageous in that they may be synthesized uncontaminated by other antibodies. The modifier "monoclonal" indicates the character of the antibody as being obtained from a substantially homogeneous population of antibodies, and is not to be construed as requiring production of the antibody by any particular method.

The antibodies herein specifically include "chimeric" antibodies in which a portion of the heavy and/or light chain is identical with or homologous to corresponding sequences in antibodies derived from a particular species or belonging to a particular antibody class or subclass, while the remainder of the chain(s) is identical with or homologous to corresponding sequences in antibodies derived from another species or belonging to another antibody class or subclass, as well as fragments of such antibodies, so long as they exhibit the desired biological activity (U.S. Pat. No. 4,816,567; and Morrison et al (1984) Proc. Natl. Acad. Sci. USA, 81:6851-6855). Chimeric antibodies of interest herein include "primatized" antibodies comprising variable domain antigen-binding sequences derived from a non-human primate (e.g., Old World Monkey, Ape etc) and human constant region sequences.

An "intact antibody chain" as used herein is one comprising a full length variable region and a full length constant region. An intact "conventional" antibody comprises an intact light chain and an intact heavy chain, as well as a light chain constant domain (CL) and heavy chain constant domains, CH1, hinge, CH2 and CH3 for secreted IgG. Other isotypes, such as IgM or IgA may have different CH and CL domains. The constant domains may be native sequence constant domains (e.g., human native sequence constant domains) or amino acid sequence variants thereof. The intact antibody may have one or more "effector functions" which refer to those biological activities attributable to the Fc constant region (a native sequence Fc region or amino acid sequence variant Fc region) of an antibody. Examples of antibody effector functions include C1q binding; complement dependent cytotoxicity; Fc receptor binding; antibody-dependent cell-mediated cytotoxicity (ADCC); phagocytosis; and down regulation of cell surface receptors. Constant region variants include those that alter the effector profile, binding to Fc receptors, and the like.

Depending on the amino acid sequence of the constant domain of their heavy chains, intact antibodies can be assigned to different "classes." There are five major classes of intact immunoglobulin antibodies: IgA, IgD, IgE, IgG, and IgM, and several of these may be further divided into "subclasses" (isotypes), e.g., IgG1, IgG2, IgG3, IgG4, IgA1, and IgA2. The heavy-chain constant domains that correspond to the different classes of antibodies are called α, δ, ε, γ, and μ, respectively. The subunit structures and three-dimensional configurations of different classes of immunoglobulins are well known. Ig forms include hinge-modifications or hingeless forms (Roux et al (1998) J. Immunol. 161:4083-4090; Lund et al (2000) Eur. J. Biochem. 267: 7246-7256; US 2005/0048572; US 2004/0229310). The light chains of antibodies from any vertebrate species can be assigned to one of two clearly distinct types, called κ and λ, based on the amino acid sequences of their constant domains.

A "functional Fc region" possesses an "effector function" of a native-sequence Fc region. Exemplary effector functions include C1q binding; CDC; Fc-receptor binding; ADCC; ADCP; down-regulation of cell-surface receptors (e.g., B-cell receptor), etc. Such effector functions generally require the Fc region to be interact with a receptor, e.g. the FcγRI; FcγRIIA; FcγRIIB1; FcγRIIB2; FcγRIIIA; FcγRIIIB receptors, and the recycling receptor, FcRn; and can be assessed using various assays as disclosed, for example, in definitions herein. A "dead" or silenced Fc is one that has been mutagenized to retain activity with respect to, for example, prolonging serum half-life, but which does not bind to or activate the low and high affinity Fc receptors.

"Fv" is the minimum antibody fragment, which contains a complete antigen-recognition and antigen-binding site. The Fab fragment contains the constant domain (CL) of the light chain and the first constant domain (CH1) of the heavy chain. Fab' fragments differ from Fab fragments by the addition of a few residues at the carboxy terminus of the heavy chain CH1 domain including one or more cysteines from the antibody hinge region.

"Antibody fragment", and all grammatical variants thereof, as used herein are defined as a portion of an intact antibody comprising the antigen binding site or variable region of the intact antibody, wherein the portion is free of the constant heavy chain domains (i.e. CH2, CH3, and CH4, depending on antibody isotype) of the Fc region of the intact antibody. Examples of antibody fragments include Fab, Fab', Fab'-SH, F(ab')$_2$, and Fv fragments; diabodies; any antibody fragment that is a polypeptide having a primary structure consisting of one uninterrupted sequence of contiguous amino acid residues (referred to herein as a "single-chain antibody fragment" or "single chain polypeptide"), including without limitation (1) single-chain Fv (scFv) molecules; nanobodies or domain antibodies comprising single Ig domains from human or non-human species or other specific single-domain binding modules including non-antibody binding proteins such as, but not limited to, adnectins and anticalins; and multispecific or multivalent structures formed from antibody fragments.

As used in this disclosure, the term "epitope" means any antigenic determinant on an antigen to which the paratope of an antibody binds. Epitopic determinants usually consist of chemically active surface groupings of molecules such as amino acids or sugar side chains and usually have specific three dimensional structural characteristics, as well as specific charge characteristics.

The word "label" when used herein refers to a detectable compound or composition which is conjugated directly or indirectly to the binding protein. The label may itself be detectable by itself (directly detectable label) (e.g., radio-isotope labels or fluorescent labels) or, or the label can be indirectly detectable, e.g., in the case of an enzymatic label, the enzyme may catalyze a chemical alteration of a substrate compound or composition and the product of the reaction is detectable.

As used herein, the term "correlates," or "correlates with," and like terms, refers to a statistical association between instances of two events, where events include numbers, data sets, and the like. For example, when the events involve numbers, a positive correlation (also referred to herein as a "direct correlation") means that as one increases, the other increases as well. A negative correlation (also referred to herein as an "inverse correlation") means that as one increases, the other decreases.

Hepatitis B virus (HBV) is a hepatotropic virus that can cause severe liver diseases including acute and chronic hepatitis, cirrhosis and hepatocellular carcinoma (HCC). Globally, there are approximately 250 million people suffering from chronic HBV infection, resulting in nearly one million deaths annually. HBV is an enveloped virus with a circular and partially double-stranded DNA genome of approximate 3.2-kb. After the infection of hepatocytes, the HBV genome is delivered into the nucleus where it is repaired to form a covalently closed circular DNA (cccDNA), which then serves as the template to direct viral RNA transcription. The cccDNA is highly stable in the nucleus of infected hepatocyte, and is a reason why chronic HBV infection is difficult to treat, as the cessation of the treatments often leads to the reappearance of the virus. In addition, the HBV genome integrates into the host cell genome, and there is no specific treatment to reverse this process. A significant percentage of the vast amounts of immunosuppressing HBsAg that are secreted from infected cells is derived from such integrated genomes.

The viral genome is compact and encodes four overlapping genes named S, C, P and X. The S gene codes for the viral envelope proteins known as surface antigens (HBsAgs). The C gene codes for the 21-kDa core protein and the 25-kDa precore protein. The core protein packages its own mRNA, also known as the pregenomic RNA (pgRNA), to form the core particle that displays the core antigenic determinant (i.e., the core antigen, HBcAg). The precore protein contains the entire sequence of the core protein plus an amino-terminal extension of 29 amino acids. The secreted precore protein derivative is known as the e antigen (HBeAg). The spontaneous loss of HBeAg and the development of antibodies against HBeAg, known as HBeAg seroconversion, have been observed in many chronic HBV patients and are often preceded by flares of hepatitis due to enhanced cytotoxic T lymphocyte (CTL) responses. The P gene codes for the viral DNA polymerase, which is also a reverse transcriptase, and the X gene codes for a regulatory protein that has many functions including the enhancement of viral gene expression and replication. After the formation of the viral core particle, the HBV pgRNA is reverse-transcribed by the viral DNA polymerase that is also packaged to become the circular and partially double-stranded DNA genome. The core particles subsequently interact with HBsAgs in intracellular membranes for the formation of mature viral particles, which are then released from infected hepatocytes. HBsAg can also be released from cells as empty subviral particles, often in vast excess of virions.

HBV establishes chronic infection in approximately 250 million people worldwide. The research in recent years has generated significant amount of information for understanding how HBV evades host immunity to establish persistence. HBV can harness type I IFN responses and suppress NK cells to enhance its own replication. It can also take advantage of the developing immune system of young children and the gut microbiota as well as educate fetal immunity to facilitate its persistence in patients after its vertical transmission. The studies by various groups pointed to an important role of Kupffer cells in promoting HBV clearance and persistence. The current treatments for HBV infection include IFN-α or its pegylated derivative and nucleoside/nucleotide analogs. These drugs are less than satisfactory, as they generate sustained response in only a small fraction of patients.

Hepatitis D (hepatitis delta) is a disease caused by the hepatitis D virus (HDV), a small spherical enveloped virusoid. HDV is considered to be a subviral satellite because it can propagate only in the presence of the hepatitis B virus (HBV). Transmission of HDV can occur either via simultaneous infection with HBV (coinfection) or superimposed on chronic hepatitis B or hepatitis B carrier state (superinfection). Both superinfection and coinfection with HDV results in more severe complications compared to infection with HBV alone. These complications include a greater likelihood of experiencing liver failure in acute infections and a rapid progression to liver cirrhosis, with an increased risk of developing liver cancer in chronic infections.

The HDV is a small, spherical virus with a 36 nm diameter. It has an outer coat containing three HBV envelope proteins, large, medium, and small hepatitis B surface antigens, and host lipids surrounding an inner nucleocapsid. The nucleocapsid contains single-stranded, circular RNA of 1679 nucleotides and about 200 molecules of hepatitis D antigen (HDAg) for each genome. The central region of HDAg has been shown to bind RNA. The HDV genome exists as an enveloped, negative sense, single-stranded, closed circular RNA. Its nucleotide sequence is 70% self-complementary, allowing the genome to form a partially double-stranded, rod-like RNA structure.

HDV is known to produce one protein, HDAg. It comes in two forms; a 27 kDa large-HDAg, and a small-HDAg of 24 kDa. The N-terminals of the two forms are identical, they differ by 19 more amino acids in the C-terminal of the large HDAg. Both isoforms are produced from the same reading frame which contains an UAG stop codon at codon 196, which normally produces only the small-HDAg (HDAg-S). However, editing by cellular enzyme adenosine deaminase-1 changes the stop codon to UGG, allowing the large-HDAg (HDAg-L) to be produced. HDAg-S is produced in the early stages of an infection and enters the nucleus and supports viral replication. HDAg-L is produced during the later stages of an infection, acts as an inhibitor of viral replication, and in its prenylated form is required for assembly of viral particles. RNA editing is critical to the virus' life cycle because it regulates the balance between viral replication and virion assembly.

The routes of transmission of hepatitis D are similar to those for hepatitis B. Infection is largely restricted to persons at high risk of hepatitis B infection, particularly injecting drug users and persons receiving clotting factor concentrates, but also sexual transmission. Worldwide more than 15 million people are co-infected. HDV is rare in most developed countries, and is mostly associated with intravenous drug use. However, HDV is much more common in the immediate Mediterranean region, sub-Saharan Africa, the Middle East, and the northern part of South America.

Current established treatments for chronic hepatitis D include conventional or pegylated interferon alpha therapy. Pegylated interferon alpha may be effective in reducing the viral load and the effect of the disease during the time the drug is given, but the benefit generally stops if the drug is discontinued. The efficiency of this treatment does not usually exceed ~20%, and late relapse after therapy has been reported. Prenylation inhibitors, such as lonafarnib, and pegylated interferon lambda have also been shown in clinical trials to have efficacy against HDV.

The hepatitis C virus (HCV) is a small, enveloped, single-stranded, positive-sense RNA virus. It is a member of the genus Hepacivirus in the family Flaviviridae. There are seven major genotypes of HCV, which are known as genotypes one to seven. The genotypes are divided into several subtypes with the number of subtypes depending on the genotype. In the United States, about 70% of cases are caused by genotype 1, 20% by genotype 2 and about 1% by each of the other genotypes. Genotype 1 is also the most common in South America and Europe.

Hepatitis C is an infectious disease caused by the hepatitis C virus (HCV) that primarily affects the liver. During the initial infection people often have mild or no symptoms. Occasionally a fever, dark urine, abdominal pain, and yellow tinged skin occurs. The virus persists in the liver in about 75% to 85% of those initially infected. Early on chronic infection typically has no symptoms. Over many years however, it often leads to liver disease and occasionally cirrhosis. In some cases, those with cirrhosis will develop serious complications such as liver failure, liver cancer, or dilated blood vessels in the esophagus and stomach.

HCV is spread primarily by blood-to-blood contact associated with intravenous drug use, poorly sterilized medical equipment, needlestick injuries in healthcare, and transfusions. Using blood screening, the risk from a transfusion is less than one per two million. It may also be spread from an infected mother to her baby during birth. It is not spread by superficial contact. Diagnosis is by blood testing to look for either antibodies to the virus or its RNA. Testing is recommended in all people who are at risk.

There is no vaccine against hepatitis C. Prevention includes harm reduction efforts among people who use intravenous drugs and testing donated blood. Chronic infection can be cured about 95% of the time with antiviral medications such as sofosbuvir or simeprevir. Peginterferon and ribavirin were earlier generation treatments that had a cure rate of less than 50% and greater side effects. Those who develop cirrhosis or liver cancer may require a liver transplant, and hepatitis C is the leading reason for liver transplantation, though the virus usually recurs after transplantation.

An estimated 143 million people (2%) worldwide are infected with hepatitis C as of 2015. In 2013 about 11 million new cases occurred. It occurs most commonly in Africa and Central and East Asia. About 167,000 deaths due to liver cancer and 326,000 deaths due to cirrhosis occurred in 2015 due to hepatitis C.

Human papilloma virus (HPV) is a small double-stranded circular DNA virus with a genome of approximately 8000 base pairs. The HPV life cycle strictly follows the differentiation program of the host keratinocyte. It is thought that the HPV virion infects epithelial tissues through micro-abrasions, whereby the virion associates with putative receptors such as alpha integrins, laminins, and annexin A2 leading to entry of the virions into basal epithelial cells through clathrin-mediated endocytosis and/or caveolin-mediated endocytosis depending on the type of HPV. At this point, the viral genome is transported to the nucleus by unknown mechanisms and establishes itself at a copy number of $10^{-200}$ viral genomes per cell. A sophisticated transcriptional cascade then occurs as the host keratinocyte begins to divide and become increasingly differentiated in the upper layers of the epithelium. The two primary oncoproteins of high risk HPV types are E6 and E7. The HPV genome is composed of six early (E1, E2, E4, E5, E6, and E7) open-reading frames (ORF), two late (L1 and L2) ORFs, and a non-coding long control region (LCR). After the host cell is infected viral early promoter is activated and a polycistronic primary RNA containing all six early ORFs is transcribed. This polycistronic RNA then undergoes active RNA splicing to generate multiple isoforms of mRNAs. One of the spliced isoform RNAs, E6*1, serves as an E7 mRNA to translate E7 protein. However, viral early transcription subjects to viral E2 regulation and high E2 levels repress the transcription. HPV genomes integrate into host genome by disruption of E2 ORF, preventing E2 repression on E6 and E7. Thus, viral genome integration into host DNA genome increases E6 and E7 expression to promote cellular proliferation and the chance of malignancy. The degree to which E6 and E7 are expressed is correlated with the type of cervical lesion that can ultimately develop.

More than 40 types are transmitted through sexual contact and infect the anus and genitals. Risk factors for persistent sexually transmitted types include early age of first sexual intercourse, multiple partners, smoking, and poor immune function. These types are typically spread by sustained direct skin-to-skin contact, with vaginal and anal sex being the most common methods. Occasionally, it can spread from a mother to her baby during pregnancy. HPV is believed to cause cancer both by integrating into DNA and in non-integrated episomes.

Most HPV infections cause no symptoms and resolve spontaneously. In some people, an HPV infection persists and results in warts or precancerous lesions. The precancerous lesions increase the risk of cancer of the cervix, vulva, vagina, penis, anus, mouth, or throat. About a dozen HPV types (including types 16, 18, 31, and 45) are called "high-risk" types because persistent infection has been linked to cancers such as cancer of the oropharynx, larynx, vulva, vagina, cervix, penis, and anus. These cancers all involve sexually transmitted infection of HPV to the stratified epithelial tissue. Individuals infected with both HPV and HIV have an increased risk of developing cervical or anal cancer. Nearly all cervical cancer is due to HPV with two types, HPV16 and HPV18, accounting for 70% of cases. Between 60% and 90% of the other cancers mentioned above are also linked to HPV. HPV6 and HPV11 are common causes of genital warts and laryngeal papillomatosis.

HPV is the most common sexually transmitted infection globally. In 2018, an estimated 569,000 new cases and 311,000 deaths occurred from cervical cancer worldwide. Around 85% of these occurred in low- and middle-income countries. In the United States, about 30,700 cases of cancer due to HPV occur each year. About 1% of sexually active adults have genital warts.

Herpes simplex viruses (HSV) (human herpesviruses types 1 and 2) commonly cause recurrent infection affecting the skin, mouth, lips, eyes, and genitals. Common severe infections include encephalitis, meningitis, neonatal herpes, and, in immunocompromised patients, disseminated infection. Mucocutaneous infections cause clusters of small painful vesicles on an erythematous base. Diagnosis is clinical; laboratory confirmation by culture, PCR, direct immunofluorescence, or serologic testing can be done. Treatment is symptomatic; antiviral therapy with acyclovir, valacyclovir, or famciclovir is helpful for severe infections and, if begun early, for recurrent or primary infections.

Both types of herpes simplex virus (HSV), HSV-1 and HSV-2, can cause oral or genital infection. Most often, HSV-1 causes gingivostomatitis, herpes labialis, and herpes keratitis. HSV-2 usually causes genital lesions.

Transmission of HSV results from close contact with a person who is actively shedding virus. Viral shedding occurs from lesions but can occur even when lesions are not apparent.

After the initial infection, HSV remains dormant in nerve ganglia, from which it can periodically emerge, causing symptoms. Diseases Caused by Herpes Simplex Virus include mucocutaneous infection (most common), including genital herpes, ocular infection (herpes keratitis), CNS infection and neonatal herpes. In patients with HIV infection, herpetic infections can be particularly severe. Progressive and persistent esophagitis, colitis, perianal ulcers, pneumonia, encephalitis, and meningitis may occur.

Human cytomegalovirus (HCMV, HHV-5), belongs to the Herpesviridae family, subfamily Betaherpesviridae, genus Cytomegalovirus. The HCMV genome consists of a double-stranded DNA with approximately 230,000 bp. The genome is enclosed by an icosahedral capsid (100-110 nm diameter, 162 capsomers). Between the capsid and the virus envelope is a protein layer known as the tegument. The virus envelope is derived from cell membranes. At least eight different viral glycoproteins are embedded in the lipid bilayer. The mature viral particle has a diameter of 150-200 nm. Like all herpesviruses, HCMV is sensitive to low pH, lipid-dissolving agents, and heat. HCMV has a half-life of approximately 60 min at 37° C. and is relatively unstable at −20° C.

After adsorption of the virus onto the target cell with the aid of viral glycoproteins, the virus envelope fuses with the cell membrane, the capsid is released into the cell and is transported to the nucleus where the genome is released. Transcription of the IE proteins then takes place in the cell nucleus with the aid of the RNA polymerase II of the host cell. Tegument proteins of the infecting virus particle act as transactivators for the IE genes. The IE proteins regulate the following stages of viral replication and are also involved in cell regulation including the expression and transport of the HLA antigens (class I MHC proteins) to the proteasoma. IE proteins (in particular the phosphoprotein pp65) can be used as early markers of the virus infection in cell cultures. The E proteins include the HCMV-coded DNA polymerase interacting with viral nucleotide kinases, the activity of which can be specifically inhibited with antiviral agents.

In immunocompetent individuals, most HCMV infections take an asymptomatic course or display minor symptoms not very characteristic for the disease. HCMV finds its way into the body by means of mucous membrane contact or parenterally (via blood components containing cells or via stem cell/organ transplants), and can lead to a general infection with involvement of the organism such as encephalitis, retinitis, hepatitis, nephritis, splenomegaly, and colitis. Transmission of the virus to the fetus/child can be transplacental or via cervical or vaginal secretions and breast milk (peri- and postnatal infection). Also sexual transmission via cervical secretions or semen, or via the saliva is possible.

Congenital infections are usually caused by a primary infection of the mother during pregnancy with an intrauterine transmission rate of 40-50%. Furthermore, preconceptionally HCMV-seropositive mothers can be infected with an additional HCMV strain (maternal secondary infection) with an infection rate of 1% of all neonates of seropositive mothers. About 7-10% of HCMV-infected infants develop disease involving clinical manifestations such as petechiae, jaundice, hepatosplenomegaly, chorioretinitis and sometimes permanent neurological damage (e.g. mental retardation, impaired hearing or even deafness, motor deficits) the consequences of which are fatal in about 10% of cases.

Important pathogenetic mechanisms for the occurrence of HCMV disease in tissue or organ transplant recipients are lack of immunity and/or immunosuppression on the one hand and reactivation of the latent virus in the event of pre-existing HCMV infection of the recipient on the other. The reactivation of HCMV can be triggered or intensified by, amongst other things, interactions with other viruses (e.g. HHV-6) or increased cytokine production to the point of a 'cytokine storm', during bacterial infections, graft-versus-host disease (GVHD), or treatment with anti-lymphocytic antibodies. Consequently, in addition to serological status and the type and intensity of immunosuppressive treatment, other risk factors for HCMV disease are inter-current bacterial and fungal infections, hepatitis following liver transplant, or GVHD following allogenic stem cell transplantation.

HIV-infected individuals are very frequently seropositive for HCMV and usually develop symptoms as a consequence of the reactivation of the latent virus due to progressing immunosuppression and only rarely as a result of primary infection. The occurrence of clinical HCMV manifestations correlates with the severity of the immunosuppression, and patients with CD4+T lymphocyte levels<50-100/µl are particularly affected.

Other herpesvirus of interest include, for example, EBV, VZV and HHV-8, all of which can integrate into the host genome and may be associated with development of cancer, such as Kaposi's sarcoma, development of shingles (VZV), and the like.

The human immunodeficiency viruses (HIV) are two species of Lentivirus (a subgroup of retrovirus) that causes HIV infection and over time acquired immunodeficiency syndrome (AIDS). Lentiviruses are transmitted as single-stranded, positive-sense, enveloped RNA viruses. Upon entry into the target cell, the viral RNA genome is reverse transcribed into double-stranded DNA by a virally encoded enzyme, reverse transcriptase, that is transported along with the viral genome in the virus particle. The resulting viral DNA is then imported into the cell nucleus and integrated into the cellular DNA by a virally encoded enzyme, integrase, and host co-factors. Once integrated, the virus may become latent, allowing the virus and its host cell to avoid detection by the immune system, for an indiscriminate amount of time. The HIV virus can remain dormant in the human body for up to ten years after primary infection; during this period the virus does not cause symptoms. Alternatively, the integrated viral DNA may be transcribed, producing new RNA genomes and viral proteins, using host cell resources, that are packaged and released from the cell as new virus particles that will begin the replication cycle anew.

Two types of HIV have been characterized: HIV-1 and HIV-2. HIV-1 is the virus that was initially discovered and termed both lymphadenopathy associated virus (LAV) and human T-lymphotropic virus 3 (HTLV-III). HIV-1 is more virulent and more infective than HIV-2, and is the cause of the majority of HIV infections globally.

The RNA genome consists of at least seven structural landmarks (LTR, TAR, RRE, PE, SLIP, CRS, and INS), and nine genes (gag, pol, and env, tat, rev, nef, vif, vpr, vpu, and sometimes a tenth tev, which is a fusion of tat, env and rev), encoding 19 proteins. Three of these genes, gag, pol, and env, contain information needed to make the structural proteins for new virus particles. For example, env codes for a protein called gp160 that is cut in two by a cellular protease to form gp120 and gp41. The six remaining genes, tat, rev, nef, vif, vpr, and vpu (or vpx in the case of HIV-2), are regulatory genes for proteins that control the ability of HIV to infect cells, produce new copies of virus (replicate), or cause disease.

HIV-1 entry to macrophages and CD4+ T cells is mediated through interaction of the virion envelope glycoproteins (gp120) with the CD4 molecule on the target cells' membrane and also with chemokine co-receptors. Macrophage-tropic (M-tropic) strains of HIV-1, or non-syncytia-inducing strains use the β-chemokine receptor, CCR5, for entry and are thus able to replicate in both macrophages and CD4+ T cells. This CCR5 co-receptor is used by almost all primary HIV-1 isolates regardless of viral genetic subtype.

The management of HIV/AIDS normally includes the use of multiple antiretroviral drugs. In many parts of the world, HIV has become a chronic condition in which progression to AIDS is increasingly rare. HIV latency, and the consequent viral reservoir in CD4+ T cells, dendritic cells, as well as macrophages, is the main barrier to eradication of the virus.

As used herein "cancer" includes any form of cancer, including but not limited to solid tumor cancers (e.g., lung, prostate, breast, bladder, colon, ovarian, pancreas, kidney, liver, glioblastoma, medulloblastoma, leiomyosarcoma, head & neck squamous cell carcinomas, melanomas, neuroendocrine; etc.) and liquid cancers (e.g., hematological cancers); carcinomas; soft tissue tumors; sarcomas; teratomas; melanomas; leukemias; lymphomas; and brain cancers, including minimal residual disease, and including both primary and metastatic tumors. Any cancer is a suitable cancer to be treated by the subject methods and compositions.

Carcinomas are malignancies that originate in the epithelial tissues. Examples of carcinomas include, but are not limited to: adenocarcinoma (cancer that begins in glandular (secretory) cells), e.g., cancers of the breast, pancreas, lung, prostate, and colon can be adenocarcinomas; adrenocortical carcinoma; hepatocellular carcinoma; renal cell carcinoma; ovarian carcinoma; carcinoma in situ; ductal carcinoma; carcinoma of the breast; basal cell carcinoma; squamous cell carcinoma; transitional cell carcinoma; colon carcinoma; nasopharyngeal carcinoma; multilocular cystic renal cell carcinoma; oat cell carcinoma; large cell lung carcinoma; small cell lung carcinoma; non-small cell lung carcinoma; and the like. Carcinomas may be found in prostrate, pancreas, colon, brain (usually as secondary metastases), lung, breast, skin, etc.

Soft tissue tumors are a highly diverse group of rare tumors that are derived from connective tissue. Examples of soft tissue tumors include, but are not limited to: alveolar soft part sarcoma; angiomatoid fibrous histiocytoma; chondromyoxid fibroma; skeletal chondrosarcoma; extraskeletal myxoid chondrosarcoma; clear cell sarcoma; desmoplastic small round-cell tumor; dermatofibrosarcoma protuberans; endometrial stromal tumor; Ewing's sarcoma; fibromatosis (Desmoid); fibrosarcoma, infantile; gastrointestinal stromal tumor; bone giant cell tumor; tenosynovial giant cell tumor; inflammatory myofibroblastic tumor; uterine leiomyoma; leiomyosarcoma; lipoblastoma; typical lipoma; spindle cell or pleomorphic lipoma; atypical lipoma; chondroid lipoma; well-differentiated liposarcoma; myxoid/round cell liposarcoma; pleomorphic liposarcoma; myxoid malignant fibrous histiocytoma; high-grade malignant fibrous histiocytoma; myxofibrosarcoma; malignant peripheral nerve sheath tumor; mesothelioma; neuroblastoma; osteochondroma; osteosarcoma; primitive neuroectodermal tumor; alveolar rhabdomyosarcoma; embryonal rhabdomyosarcoma; benign or malignant schwannoma; synovial sarcoma; Evan's tumor; nodular fasciitis; desmoid-type fibromatosis; solitary fibrous tumor; dermatofibrosarcoma protuberans (DFSP); angiosarcoma; epithelioid hemangioendothelioma; tenosynovial giant cell tumor (TGCT); pigmented villonodular synovitis (PVNS); fibrous dysplasia; myxofibrosarcoma; fibrosarcoma; synovial sarcoma; malignant peripheral nerve sheath tumor; neurofibroma; and pleomorphic adenoma of soft tissue; and neoplasias derived from fibroblasts, myofibroblasts, histiocytes, vascular cells/endothelial cells and nerve sheath cells.

A sarcoma is a rare type of cancer that arises in cells of mesenchymal origin, e.g., in bone or in the soft tissues of the body, including cartilage, fat, muscle, blood vessels, fibrous tissue, or other connective or supportive tissue. Different types of sarcoma are based on where the cancer forms. For example, osteosarcoma forms in bone, liposarcoma forms in fat, and rhabdomyosarcoma forms in muscle. Examples of sarcomas include, but are not limited to: askin's tumor; sarcoma botryoides; chondrosarcoma; e wing's sarcoma; malignant hemangioendothelioma; malignant schwannoma; osteosarcoma; and soft tissue sarcomas (e.g., alveolar soft part sarcoma; angiosarcoma; cystosarcoma phyllodesdermatofibrosarcoma protuberans (DFSP); desmoid tumor; desmoplastic small round cell tumor; epithelioid sarcoma; extraskeletal chondrosarcoma; extraskeletal osteosarcoma; fibrosarcoma; gastrointestinal stromal tumor (GIST); hemangiopericytoma; hemangiosarcoma (more commonly referred to as "angiosarcoma"); kaposi's sarcoma; leiomyosarcoma; liposarcoma; lymphangiosarcoma; malignant peripheral nerve sheath tumor (MPNST); neurofibrosarcoma; synovial sarcoma; undifferentiated pleomorphic sarcoma, and the like).

Hematopoietic malignancies are leukemias, lymphomas and myelomas. Leukemias are cancers that start in blood-forming tissue, such as the bone marrow, and causes large numbers of abnormal blood cells to be produced and enter the bloodstream. Examples of leukemias include, but are not limited to: Acute myeloid leukemia (AML), Acute lymphoblastic leukemia (ALL), Chronic myeloid leukemia (CML), and Chronic lymphocytic leukemia (CLL).

Lymphomas are cancers that begin in cells of the immune system. For example, lymphomas can originate in bone marrow-derived cells that normally mature in the lymphaticsystem. There are two basic categories of lymphomas. One kind is Hodgkin lymphoma (HL), which is marked by the presence of a type of cell called the Reed-Sternberg cell. There are currently 6 recognized types of HL. Examples of Hodgkin lymphomas include: nodular sclerosis classical Hodgkin lymphoma (CHL), mixed cellularity CHL, lymphocyte-depletion CHL, lymphocyte-rich CHL, and nodular lymphocyte predominant HL. The other category of lymphoma is non-Hodgkin lymphomas (NHL), which includes a large, diverse group of cancers of immune system cells. Non-Hodgkin lymphomas can be further divided into cancers that have an indolent (slow-growing) course and those that have an aggressive (fast-growing) course. There are currently 61 recognized types of NHL. Examples of non-Hodgkin lymphomas include, but are not limited to: AIDS-related Lymphomas, anaplastic large-cell lymphoma, angio-immunoblastic lymphoma, blastic NK-cell lymphoma, Burkitt's lymphoma, Burkitt-like lymphoma (small non-cleaved cell lymphoma), chronic lymphocytic leukemia/small lymphocytic lymphoma, cutaneous T-Cell lymphoma, diffuse large B-Cell lymphoma, enteropathy-type T-Cell lymphoma, follicular lymphoma, hepatosplenic gamma-delta T-Cell lymphomas, T-Cell leukemias, lymphoblastic lymphoma, mantle cell lymphoma, marginal zone lymphoma, nasal T-Cell lymphoma, pediatric lymphoma, peripheral T-Cell lymphomas, primary central nervous system lymphoma, transformed lymphomas, treatment-related T-Cell lymphomas, and Waldenstrom's macroglobulinemia.

Brain cancers include any cancer of the brain tissues. Examples of brain cancers include, but are not limited to: gliomas (e.g., glioblastomas, astrocytomas, oligodendrogliomas, ependymomas, and the like), meningiomas, pituitary adenomas, vestibular schwannomas, primitive neuroectodermal tumors (medulloblastomas), etc.

The "pathology" of cancer includes all phenomena that compromise the well-being of the patient. This includes, without limitation, abnormal or uncontrollable cell growth, metastasis, interference with the normal functioning of neighboring cells, release of cytokines or other secretory products at abnormal levels, suppression or aggravation of inflammatory or immunological response, neoplasia, premalignancy, malignancy, invasion of surrounding or distant tissues or organs, such as lymph nodes, etc.

As used herein, the terms "cancer recurrence" and "tumor recurrence," and grammatical variants thereof, refer to further growth of neoplastic or cancerous cells after diagnosis of cancer. Particularly, recurrence may occur when further cancerous cell growth occurs in the cancerous tissue. "Tumor spread," similarly, occurs when the cells of a tumor disseminate into local or distant tissues and organs; therefore tumor spread encompasses tumor metastasis. "Tumor invasion" occurs when the tumor growth spread out locally to compromise the function of involved tissues by compression, destruction, or prevention of normal organ function.

As used herein, the term "metastasis" refers to the growth of a cancerous tumor in an organ or body part, which is not directly connected to the organ of the original cancerous tumor. Metastasis will be understood to include micrometastasis, which is the presence of an undetectable amount of cancerous cells in an organ or body part which is not directly connected to the organ of the original cancerous tumor. Metastasis can also be defined as several steps of a process, such as the departure of cancer cells from an original tumor site, and migration and/or invasion of cancer cells to other parts of the body.

Compositions

Pharmaceutical Compositions. Suitable anti-CD24 agents can be provided in pharmaceutical compositions suitable for therapeutic use, e.g. for human treatment. Alternatively or in combination, agents specific for CD15, CD47, CD104, CD133 or CD257 can be provided for therapeutic use. In some embodiments, pharmaceutical compositions of the present invention include one or more therapeutic entities of the present disclosure and include a pharmaceutically acceptable carrier, a pharmaceutically acceptable salt, a pharmaceutically acceptable excipient, and/or esters or solvates thereof. In some embodiments, the use of an anti-CD24 agent includes use in combination with another therapeutic agent (e.g., another anti-infection agent). Therapeutic formulations comprising an anti-CD24 agent can be prepared by mixing the agent(s) having the desired degree of purity with a physiologically acceptable carrier, a pharmaceutically acceptable salt, an excipient, and/or a stabilizer (Remington's Pharmaceutical Sciences 16th edition, Osol, A. Ed. (1980)) (e.g., in the form of lyophilized formulations or aqueous solutions). A composition having an anti-CD24 agent can be formulated, dosed, and administered in a fashion consistent with good medical practice. Factors for consideration in this context include the particular disorder being treated, the particular mammal being treated, the clinical condition of the individual patient, the cause of the disorder, the site of delivery of the agent, the method of administration, the scheduling of administration, and other factors known to medical practitioners.

"Pharmaceutically acceptable excipient" means an excipient that is useful in preparing a pharmaceutical composition that is generally safe, non-toxic, and desirable, and includes excipients that are acceptable for veterinary use as well as for human pharmaceutical use. Such excipients can be solid, liquid, semisolid, or, in the case of an aerosol composition, gaseous.

Solid formulations for oral administration may be in any form rendering the antibody molecule accessible to the patient in the prescribed amount and within the prescribed period of time. The oral formulation can take the form of a number of solid formulations including, but not limited to, a tablet, capsule, or powder. Solid formulations may alternatively be lyophilized and brought into solution prior to administration for either single or multiple dosing. Antibody compositions should generally be formulated within a biologically relevant pH range and may be buffered to maintain a proper pH range during storage. Both liquid and solid formulations generally require storage at lower temperatures (e.g., 2-8° C.) in order to retain stability for longer periods.

Formulated antibody compositions, especially liquid formulations, may contain a bacteriostat to prevent or minimize proteolysis during storage, including but not limited to effective concentrations (e.g., ~1% w/v) of benzyl alcohol, phenol, m-cresol, chlorobutanol, methylparaben, and/or propylparaben. A bacteriostat may be contraindicated for some patients. Therefore, a lyophilized formulation may be reconstituted in a solution either containing or not containing such a component. Additional components may be added to either a buffered liquid or solid antibody formulation, including but not limited to sugars as a cryoprotectant (including but not limited to polyhydroxy hydrocarbons such as sorbitol, mannitol, glycerol, and dulcitol and/or disaccharides such as sucrose, lactose, maltose, or trehalose) and, in some instances, a relevant salt (including but not limited to NaCl, KCl, or LiCl). Such antibody formulations, especially liquid formulations slated for long term storage, will rely on a useful range of total osmolarity to both promote long term stability The antibody molecule could be administered to an individual by any route of administration appreciated in the art, including but not limited to oral administration, administration by injection (specific embodiments of which include intravenous, subcutaneous, intraperitoneal or intramuscular injection), administration by inhalation, intranasal, or topical administration, either alone or in combination with other agents designed to assist in the treatment of the individual.

The route of administration should be determined based on a number of considerations appreciated by the skilled artisan including, but not limited to, the desired physiochemical characteristics of the treatment. Treatment may be provided for example, 2-8° C. or higher, while also making the formulation useful for parenteral injection. As appropriate, preservatives, stabilizers, buffers, antioxidants and/or other additives may be included. The formulations may contain a divalent cation (including but not limited to $MgCl_2$, $CaC_2$. and $MnCl_2$) and/or a non-ionic surfactant (including but not limited to Polysorbate-80 (TWEEN 80™), Polysorbate-60 (TWEEN 60™), Polysorbate-40 (TWEEN 40™), and Polysorbate-20 (TWEEN 20™) polyoxyethylene alkyl ethers, including but not limited to BRIJ 58™, BRIJ 35™, as well as others such as TRITONX-100™, TRITONX-114™, NP40™, Span 85 and the PLURONIC® series of non-ionic surfactants (e.g., PLURONIC®121). Any combination of such components form specific embodiments of the present disclosure.

"Pharmaceutically acceptable salts and esters" means salts and esters that are pharmaceutically acceptable and have the desired pharmacological properties. Such salts include salts that can be formed where acidic protons present in the compounds are capable of reacting with inorganic or organic bases. Suitable inorganic salts include those formed with the alkali metals, e.g. sodium and potassium, magnesium, calcium, and aluminum. Suitable organic salts include those formed with organic bases such as the amine bases, e.g., ethanolamine, diethanolamine, triethanolamine, tromethamine, N-methylglucamine, and the like. Such salts also include acid addition salts formed with inorganic acids (e.g., hydrochloric and hydrobromic acids) and organic acids (e.g., acetic acid, citric acid, maleic acid, and the alkane- and arene-sulfonic acids such as methanesulfonic acid and benzenesulfonic acid). Pharmaceutically acceptable esters include esters formed from carboxy, sulfonyloxy, and phosphonoxy groups present in the compounds, e.g., $C_{1-6}$ alkyl esters. When there are two acidic groups present, a pharmaceutically acceptable salt or ester can be a mono-acid-mono-salt or ester or a di-salt or ester; and similarly where there are more than two acidic groups present, some or all of such groups can be salified or esterified. Compounds named in this invention can be present in unsalified or unesterified form, or in salified and/or esterified form, and the naming of such compounds is intended to include both the original (unsalified and unesterified) compound and its pharmaceutically acceptable salts and esters. Also, certain compounds named in this invention may be present in more than one stereoisomeric form, and the naming of such compounds is intended to include all single stereoisomers and all mixtures (whether racemic or otherwise) of such stereoisomers.

The terms "pharmaceutically acceptable", "physiologically tolerable" and grammatical variations thereof, as they refer to compositions, carriers, diluents and reagents, are used interchangeably and represent that the materials are capable of administration to or upon a human without the production of undesirable physiological effects to a degree that would prohibit administration of the composition.

"Dosage unit" refers to physically discrete units suited as unitary dosages for the particular individual to be treated. Each unit can contain a predetermined quantity of active compound(s) calculated to produce the desired therapeutic effect(s) in association with the required pharmaceutical carrier. The specification for the dosage unit forms can be dictated by (a) the unique characteristics of the active compound(s) and the particular therapeutic effect(s) to be achieved, and (b) the limitations inherent in the art of compounding such active compound(s).

Methods

Methods are provided for reducing virus load or other markers of chronic viral infections, e.g. HBV surface antigen in the case of HBV infection including without limitation and in some instances resulting in elimination of virus-infected cells in an individual, by contacting the individual with a therapeutically effective dose of an anti-CD24 agent for a period of time. In some embodiments the virus is a virus that causes chronic infection, for example by integrating into the host genome. In some embodiments the virus is a chronic hepatitis virus, e.g. hepatitis B, hepatitis C, hepatitis D. In some embodiments the virus is a lentivirus, e.g. HIV-1, HIV-2. In some embodiments the virus is a human papilloma virus. In some embodiments the virus is a herpesvirus, e.g. herpes simplex virus (HSV), human cytomegalovirus (CMV), Varicella-Zoster Virus (VZV), Kaposi-sarcoma associated virus (HHV-8), Epstein-Barr virus (EBV), etc.

In other embodiments, methods are provided for reducing virus load or other markers of chronic viral infections, e.g. HBV surface antigen in the case of HBV infection including without limitation and in some instances resulting in elimination of virus-infected cells in an individual by contacting the individual with a therapeutically effective dose of an anti-CD15, anti-CD104, anti-CD133, anti-CD257 agent for a period of time sufficient to eliminate the virus-infected cells.

An effective dose of an anti-CD24 agent can significantly reduce virus load or other markers of chronic viral infections and in some instances can eradicate the presence of a chronic virus, including without limitation HBV, at a dose that does not cause substantial toxicity to uninfected cells or the overall host. In some embodiments treatment results in undetectable levels of virus antigen, e.g. HBsAg, in blood of the individual. The effect on uninfected cells, e.g. hepatocytes, may be monitored by release of hepatocyte markers into the blood. It is to be expected that a low level of such markers will be detected from the killing of the infected cells, but that the dose will be sufficiently low that there are no dose limiting toxicities. Adverse effects are desirably at a level less than 3, and may be less than 2, or less than 1, using conventional criteria, e.g. CDCAE v 5.

The treatment course may be less than about 12 weeks, less than about 8 weeks, less than about 4 weeks, and may be, for example, from 1-12 weeks, from 2-12 weeks, from 4-12 weeks, from 4-8 weeks, etc. Administration may be once a week, twice a week, every other day, daily, every two weeks, etc., and in some embodiments is once a week. In some embodiments, more than one course of treatment is administered.

In other embodiments, administration of an anti-CD24 agent is combined with administration of an agent that specifically targets a second antigen upregulated on virus-infected cells. Markers of interest include, without limitation, CD15, CD104, CD257, CD105, CD133, and CD47. In some embodiments the agent that binds to a second antigen is an antibody. In some embodiments a bispecific antibody that targets CD24 and a second antigen is administered. In other embodiments, a bispecific antibody may be employed that binds CD24 with one arm and either CD3e (to redirect T cells, CD16a (to redirect NK cells), or other cell surface proteins on killer cells to target the CD24-overexpressed population. In yet another embodiment, a chimeric antigen receptor (CAR)-T cell, NKT cell, or NK cell targeting CD24 with the CAR moiety may be used to kill virus containing cells.

An effective treatment will reduce the number of virus-infected cells in an individual, and preferably eliminate to a non-detectable level the number of virus-infected cells. For example, the level of virus antigens, such as HBsAg, may be reduced by at least 1 log or more, 2 logs or more, and in some instances to less than 1 ng/ml in blood, less than 0.5 ng/ml, less than 0.1 ng/ml, less than 0.05 ng/ml, less than 0.01 ng/ml. HBsAg, as measured in IU/ml, may also be reduced from baseline by 1 log, 2 logs, or more. The IU/ml may become undetectable, e.g <0.05 in some quantitative assays.

The terms "treatment", "treating", "treat" and the like are used herein to generally refer to obtaining a desired pharmacologic and/or physiologic effect. The effect can be prophylactic in terms of completely or partially preventing a disease or symptom(s) thereof and/or may be therapeutic in terms of a partial or complete stabilization or cure for a disease and/or adverse effect attributable to the disease. The term "treatment" encompasses any treatment of a disease in a mammal, particularly a human, and includes: (a) preventing the disease and/or symptom(s) from occurring in a subject who may be predisposed to the disease or symptom but has not yet been diagnosed as having it; (b) inhibiting the disease and/or symptom(s), i.e., arresting their development; or (c) relieving the disease symptom(s), i.e., causing regression of the disease and/or symptom(s). Those in need of treatment include those already inflicted (e.g., those with infection, those with an infection, those with an immune disorder, etc.) as well as those in which prevention is desired (e.g., those with increased susceptibility to infection, those with an increased likelihood of infection, those suspected of having infection, those suspected of harboring an infection, etc.).

A therapeutic treatment is one in which the subject is inflicted prior to administration and a prophylactic treatment is one in which the subject is not inflicted prior to administration. In some embodiments, the subject has an increased likelihood of becoming inflicted or is suspected of being inflicted prior to treatment. In some embodiments, the subject is suspected of having an increased likelihood of becoming inflicted.

Examples of diseases that can be treated with an anti-CD24 agent include, but are not limited to virus infection, and may further include development of cancers, including but not limited to cancers driven by virus infection, for example liver cancer driven by HBV, HCV, HDV infection; oropharyngeal cancer and cancers of the reproductive tract such as cervical, vulva, anal, and penile cancers driven by HPV infection; cancers associated with herpesvirus infection; and the like.

As used herein, the term "infection" refers to any state in at least one cell of an organism (i.e., a subject) is infected by a virus. As used herein, the term "infectious agent" refers to a foreign biological entity. For example, infectious agents include, but are not limited to bacteria, viruses, protozoans, and fungi. Infectious diseases are disorders caused by infectious agents. Some infectious agents cause no recognizable symptoms or disease under certain conditions, but have the potential to cause symptoms or disease under changed conditions. The subject methods can be used in the treatment of chronic virus infections, for example including but not limited to retrovirus, lentivirus, hepadna virus, herpes viruses, pox viruses, human papilloma viruses, etc.

In some embodiments the infection is a chronic infection, i.e. an infection that is not cleared by the host immune system within a period of up to 1 week, 2 weeks, etc. In some cases, chronic infections involve integration of pathogen genetic elements into the host genome, e.g. retroviruses, lentiviruses, Hepatitis B virus, etc. An infection treated with the methods of the invention generally involves a pathogen with at least a portion of its life-cycle within a host cell, i.e. an intracellular phase. The methods of the invention provide for a more effective removal of infected cells.

The terms "co-administration", "co-administer", and "in combination with" include the administration of two or more therapeutic agents (e.g., an anti-CD24 agent and an anti-viral agent, and/or a target cell specific antibody) either simultaneously, concurrently or sequentially within no specific time limits. In one embodiment, the agents are present in the cell or in the subject's body at the same time or exert their biological or therapeutic effect at the same time. In one embodiment, the therapeutic agents are in the same composition or unit dosage form. In other embodiments, the therapeutic agents are in separate compositions or unit dosage forms. In certain embodiments, a first agent can be administered prior to (e.g., minutes, 15 minutes, 30 minutes, 45 minutes, 1 hour, 2 hours, 4 hours, 6 hours, 12 hours, 24 hours, 48 hours, 72 hours, 96 hours, 1 week, 2 weeks, 3 weeks, 4 weeks, 5 weeks, 6 weeks, 8 weeks, or 12 weeks before), concomitantly with, or subsequent to (e.g., 5 minutes, 15 minutes, 30 minutes, 45 minutes, 1 hour, 2 hours, 4 hours, 6 hours, 12 hours, 24 hours, 48 hours, 72 hours, 96 hours, 1 week, 2 weeks, 3 weeks, 4 weeks, 5 weeks, 6 weeks, 8 weeks, or 12 weeks after) the administration of a second therapeutic agent.

Administration of an anti-CD24 agent may be combined with co-administration of any number of additional antiviral agents. Such agents may include, for example, the entry inhibitor myrcludex-b, anti-NTBC antibody, an HBV nucleoside analog (e.g. TDF, TAF, ETC), and the like. Administration of an anti-CD24 agent may be combined with a second anti-viral agent, e.g. HBsAg release inhibitor (nucleic acid polymers), HBV core inhibitors, siRNAs targeting HBV (or HDV), immunodulator (TLR agonists, etc), RT or polymerase inhibitor, therapeutic vaccines, and the like. Other antivirals may include an interferon, including interferon alfa-2b, Peginterferon alfa-2a, interferon-lambda, entecavir, lamivudine, adefovir, telbivudine, tenofovir, sofosbuvir, ledipasvir, ombitasvir, paritaprevir, ritonavir, dasabuvir, grazoprevir, elbasvir, asunaprevir, declatasvir or beclabuvir.

An anti-CD24 agent need not be, but is optionally formulated with one or more agents that potentiate activity, or that otherwise increase the therapeutic effect. These are generally used in the same dosages and with administration routes as used herein or from 1 to 99% of the heretofore employed dosages. In some embodiments, treatment is accomplished by administering a combination (co-administration) of a subject anti-CD24 agent and/or another agent that opsonizes a target cell.

Treatment may also be combined with other active agents, such as antibiotics, cytokines, anti-viral agents, etc. Classes of antibiotics include penicillins, e.g. penicillin G, penicillin V, methicillin, oxacillin, carbenicillin, nafcillin, ampicillin, etc.; penicillins in combination with β-lactamase inhibitors, cephalosporins, e.g. cefaclor, cefazolin, cefuroxime, moxalactam, etc.; carbapenems; monobactams; aminoglycosides; tetracyclines; macrolides; lincomycins; polymyxins; sulfonamides; quinolones; cloramphenical; metronidazole; spectinomycin; trimethoprim; vancomycin; etc. Cytokines may also be included, e.g. interferon γ, tumor necrosis factor α, interleukin 12, etc. Antiviral agents, e.g. acyclovir, gancyclovir, etc., may also be used in treatment.

A "therapeutically effective dose" or "therapeutic dose" is an amount sufficient to effect desired clinical results (i.e., achieve therapeutic efficacy). A therapeutically effective dose can be administered in one or more administrations. In some embodiments the anti-CD24 agent is an antibody specific for human CD24, which optionally is a chimeric or humanized monoclonal antibody. In some embodiments an anti-CD24 antibody is administered at a dose of less than 8 mg/kg body weight, less than 2.5 mg/kg, less than 1 mg/kg, less than 0.75 mg/kg, less than 0.5 mg/kg, less than 0.25 mg/kg, less than 0.1 mg/kg, less than 0.05 mg/kg, less than 0.01 mg/kg. The therapeutic dose may be, for example, from 0.1 to 5 mg/kg, from 0.25 to 5 mg/kg, from 0.5 to 5 mg/kg, from 0.75 to 5 mg/kg, from 1 to 5 mg/kg; or from 0.1 to 2.5 mg/kg, from 0.25 to 2.5 mg/kg, from 0.5 to 2.5 mg/kg, from 0.75 to 2.5 mg/kg; from 0.1 to 1 mg/kg, from 0.25 to 1 mg/kg, from 0.5 to 1 mg/kg, from 0.75 to 1 mg/kg, etc.

Dosage and frequency may vary depending on the half-life of the anti-CD24 agent. It will be understood by one of skill in the art that such guidelines will be adjusted for the molecular weight of the active agent, e.g. in the use of antibody fragments, in the use of antibody conjugates, in the use of anti-CD24 agents etc. The dosage may also be varied for localized administration, e.g. intranasal, inhalation, etc., or for systemic administration, e.g. i.m., i.p., i.v., s.c., and the like.

An anti-CD24 agent can be administered by any suitable means, including topical, oral, parenteral, intrapulmonary, and intranasal. Parenteral infusions include intramuscular, intravenous (bolus or slow drip), intraarterial, intraperitoneal, intrathecal or subcutaneous administration. An anti-CD24 agent can be administered in any manner which is medically acceptable. This may include injections, by parenteral routes such as intravenous, intravascular, intraarterial, subcutaneous, intramuscular, intratumor, intraperitoneal, intraventricular, intraepidural, or others as well as oral, nasal, ophthalmic, rectal, or topical. Sustained release administration is also specifically included in the disclosure, by such means as depot injections or erodible implants. Localized delivery is particularly contemplated, by such means as delivery via a catheter to one or more arteries, such as the renal artery or a vessel supplying a localized tumor.

As noted above, an anti-CD24 agent can be formulated with a pharmaceutically acceptable carrier (one or more organic or inorganic ingredients, natural or synthetic, with which a subject agent is combined to facilitate its application). A suitable carrier includes sterile saline although other aqueous and non-aqueous isotonic sterile solutions and sterile suspensions known to be pharmaceutically acceptable are known to those of ordinary skill in the art. An "effective amount" refers to that amount which is capable of ameliorating or delaying progression of the diseased, degenerative or damaged condition. An effective amount can be determined on an individual basis and will be based, in part, on consideration of the symptoms to be treated and results sought. An effective amount can be determined by one of ordinary skill in the art employing such factors and using no more than routine experimentation.

An anti-CD24 agent is often administered as a pharmaceutical composition comprising an active therapeutic agent and another pharmaceutically acceptable excipient. The preferred form depends on the intended mode of administration and therapeutic application. The compositions can also include, depending on the formulation desired, pharmaceutically-acceptable, non-toxic carriers or diluents, which are defined as vehicles commonly used to formulate pharmaceutical compositions for animal or human administration. The diluent is selected so as not to affect the biological activity of the combination. Examples of such diluents are distilled water, physiological phosphate-buffered saline, Ringer's solutions, dextrose solution, and Hank's solution. In addition, the pharmaceutical composition or formulation may also include other carriers, adjuvants, or nontoxic, nontherapeutic, nonimmunogenic stabilizers and the like.

Compositions can be prepared as injectables, either as liquid solutions or suspensions; solid forms suitable for solution in, or suspension in, liquid vehicles prior to injection can also be prepared. The preparation also can be emulsified or encapsulated in liposomes or micro particles such as polylactide, polyglycolide, or copolymer for enhanced adjuvant effect, as discussed above. Langer, Science 249: 1527, 1990 and Hanes, Advanced Drug Delivery Reviews 28: 97-119, 1997. The agents of this invention can be administered in the form of a depot injection or implant preparation which can be formulated in such a manner as to permit a sustained or pulsatile release of the active ingredient. The pharmaceutical compositions are generally formulated as sterile, substantially isotonic and in full compliance with all Good Manufacturing Practice (GMP) regulations of the U.S. Food and Drug Administration.

Toxicity of the anti-CD24 agents can be determined by standard pharmaceutical procedures in cell cultures or experimental animals, e.g., by determining the $LD_{50}$ (the dose lethal to 50% of the population) or the $LD_{100}$ (the dose lethal to 100% of the population). The dose ratio between toxic and therapeutic effect is the therapeutic index. The data obtained from these cell culture assays and animal studies can be used in further optimizing and/or defining a therapeutic dosage range and/or a sub-therapeutic dosage range (e.g., for use in humans). The exact formulation, route of administration and dosage can be chosen by the individual physician in view of the patient's condition.

Kits

Also provided are kits for use in the methods. The subject kits can include an anti-CD24 agent. In some embodiments, an anti-CD24 agent is provided in a dosage form (e.g., a therapeutically effective dosage form. In the context of a kit, an anti-CD24 agent can be provided in liquid or solid form in any convenient packaging (e.g., stick pack, dose pack, etc.). The agents of a kit can be present in the same or separate containers. The agents may also be present in the same container. In addition to the above components, the subject kits may further include (in certain embodiments) instructions for practicing the subject methods. These instructions may be present in the subject kits in a variety of forms, one or more of which may be present in the kit. One form in which these instructions may be present is as printed information on a suitable medium or substrate, e.g., a piece or pieces of paper on which the information is printed, in the packaging of the kit, in a package insert, and the like. Yet another form of these instructions is a computer readable medium, e.g., diskette, compact disk (CD), flash drive, and the like, on which the information has been recorded. Yet another form of these instructions that may be present is a website address which may be used via the internet to access the information at a removed site.

The invention now being fully described, it will be apparent to one of ordinary skill in the art that various changes and modifications can be made without departing from the spirit or scope of the invention.

EXPERIMENTAL

The following examples are put forth so as to provide those of ordinary skill in the art with a complete disclosure and description of how to make and use the present invention, and are not intended to limit the scope of what the inventors regard as their invention nor are they intended to represent that the experiments below are all or the only experiments performed. Efforts have been made to ensure accuracy with respect to numbers used (e.g. amounts, temperature, etc.) but some experimental errors and deviations should be accounted for. Unless indicated otherwise, parts are parts by weight, molecular weight is weight average molecular weight, temperature is in degrees Centigrade, and pressure is at or near atmospheric.

The present invention has been described in terms of particular embodiments found or proposed by the present inventor to comprise preferred modes for the practice of the invention. It will be appreciated by those of skill in the art that, in light of the present disclosure, numerous modifications and changes can be made in the particular embodiments exemplified without departing from the intended scope of the invention. For example, due to codon redundancy, changes can be made in the underlying DNA sequence without affecting the protein sequence. Moreover, due to biological functional equivalency considerations, changes can be made in protein structure without affecting the biological action in kind or amount. All such modifications are intended to be included within the scope of the appended claims.

Example 1

To identify host cell targets for combatting HBV infections, we performed a screen for host cell surface proteins whose expression increases upon HBV infection. The Human Cell Surface Marker Screening (PE) Kit, Human Antibody Panel (PE) kit available from Biolegend was used to compare surface protein expression levels between HBV-infected cells vs. non-infected cells. We used 2.2.15 cells (HepG2 derived cells that harbor the HBV genome) as HBV infected cells and compared surface protein expression level with uninfected HepG2 cells. Interestingly, we found that the 2.2.15 cells harbor two distinct populations, one with high CD47 expression (CD47H), and one with low CD47 expression (CD47L). Using FACS, we isolated these two populations, and compared surface protein expression of both CD47H 2.2.15 cells and CD47L 2.2.15 cells to HepG2 and identified a set of surface markers that are elevated in both the CD47H and CD47L 2.2.15 cells compared to HepG2 (Table 1). We also confirmed that both the CD47L and C47H 2.2.1.5 cells contain comparable level of HBsAg and DNA. As a confirmation, we also transfected HepG2 cells with the HBV genome and a neomycin selection plasmid and selected a clone that harbors the HBV genome and confirmed that these HBV infected cells indeed upregulated the surface expression of those proteins.

TABLE 1

Surface proteins whose expression increases with HBV infection.

| Surface Markers | Fold increased |
| --- | --- |
| CD24 | 10 |
| CD15 | 6 |
| CD104 | 4 |
| CD257 | 5 |

TABLE 1-continued

Surface proteins whose expression increases with HBV infection.

| Surface Markers | Fold increased |
| --- | --- |
| CD105 | 2 |
| CD133* | 36 |
| CD47 | 5 (selected clones) |

*determined by qPCR

Among those surface proteins whose expression increases the most in the presence of HBV is CD24. Using qPCR assays, we discovered that CD24 is elevated at the transcript level. Our qPCR screen also uncovered CD133 mRNA to be significantly elevated in cells infected with HBV compared to noninfected cells. We hypothesized that specific targeting of CD24 would be detrimental to HBV. One way of targeting CD24 is to use a monoclonal antibody specific for human CD24.

Other ways to target CD24 include high affinity peptide binding to CD24 with or without being fused to Fc, with or without pegylation, or to human serum albumin (HSA), or to proteins that bind either IgGs or HSA. Another potential way to target CD24 are using one of the normal ligands, i.e., Siglec-10 or P-selectin, mutated ("mutein"-like) to act as an antagonist, fused to a half-life extension module such as Fc or HSA. CD24 expression can also be reduced with CRISPR, siRNA, or LNA targeting CD24. Small molecules that bind to CD24 can also be used to disrupt the CD24 axis, including DNA/RNA aptamers for CD24.

NSG mice with humanized livers were prepared using the RAAPID-TKG method. These mice contain chimeric livers that harbor both murine and human hepatocytes. The mice are deficient for B and T cells, but retain macrophages. The mice can be efficiently infected with human hepatitis viruses, including HBV, HCV, and HDV. We infected such mice with an HBV inoculum from an infected patient to establish high level replication indicated by HBV DNA in the serum and expression of HBsAg in the serum as well.

Cohorts of mice were treated with anti-human CD24, anti-human CD47 (see Table 1), the combination of the two, or vehicle control. Doses used were those commonly used to treat cancer with anti-human CD47, 200 g/day administered IP (Weiskopf et al. Science (2013)). The mice tolerated the treatments well and the level of HBV DNA, HBsAg, and human albumin in the sera was monitored as a function of time (see Table 2

TABLE 2

Time course of treatments with high dose daily regimens.

| Mouse ID | HBV Infection | Antibody (200 µg/day) | Measurement | Base-Line | PTW 1 | PTW 2 | PTW 3 | PTW 4 |
| --- | --- | --- | --- | --- | --- | --- | --- | --- |
| #551 | No | No | hAlb | 5.2 | 5.6 | 5.3 | N/A | N/A |
| #534 | Yes | No | HBV DNA | 1.6E+06 | 4.8E+05 | N/A | 1.4E+05 | 1.3E+05 |
| #521 | Yes | IgG control | HBV DNA | 1.2E+07 | 6.6E+06 | N/A | 6.6E+06 | 6.2E+06 |
| #518 | Yes | CD47 | HBV DNA | 6.1E+06 | 7.1E+06 | N/A | 1.2E+07 | 1.3E+07 |
|  |  |  | HBsAg | 92.5 | 107.8 |  | NA | NA |
| #517 | Yes | CD24 (SWA11) | HBV DNA | 3.4E+07 | 6.1E+07 | 4.1E+05 | 2.1E+05 | 2.2E+05 |
|  |  |  | HBsAg | >1000 | 289.5 | UD | N/A | UD |
|  |  |  | hAlb | 1.7 | N/A | 0.1 | N/A | UD |
| #555 | No | CD24(ML5) + CD47 | hAlb | 4.2 | 0.1 | UD | N/A | N/A |
| #519 | Yes | CD24(ML5) + CD47 | HBV DNA | 2.3E+08 | 2.3E+07 | 8.4E+05 | N/A | N/A |
|  |  |  | HBsAg | >1000 | 84.3 | UD | N/A | N/A |
|  |  |  | hAlb | 2.6 | 0.1 | UD | N/A | N/A |
| #522 | Yes | CD24(SWA11) + CD47 | HBV DNA | 3.2E+07 | 1.0E+06 | 2.1E+05 | 6.6E+04 | 8.8E+04 |
|  |  |  | HBsAg | 462.3 | 3.8 | UD | N/A | N/A |
|  |  |  | hAlb | 2.7 | 0.1 | UD | N/A | N/A |

UD, undetectable. N/A, Not available. PTW, post treatment week. All mice were treated daily with 200 g of each indicated antibody. Human albumin (hAlb, mg/ml), HBV DNA (copies/ml) and HBsAg (ng/ml) were measured at the indicated time points. SWA11 and ML5 are examples of mouse monoclonal anti-human CD24 antibodies.

Surprisingly, anti-CD47 antibody alone had no effect on HBsAg or HBV DNA even when it was administered at the 8 mg/kg (200 g/mice) dose daily for 4 weeks, likely reflecting the non-universal elevation of CD47 in HBV-infected cells. Anti-human CD24 was able to completely eradicate HBsAg. This was true using either the SWA11 or the ML5 anti-human. Human albumin, however, also was eradicated, indicating that not only were HBV-infected cells killed, but so were all the human hepatocytes, including the uninfected ones. This revealed that at this dose the anti-human CD24 was effective at eradicating HBV, but also had unwanted toxicity to uninfected hepatocytes, resulting in the killing of all human hepatocytes. In fact, anti-human CD24 administered at 200 ug/mouse (8 mg/kg) leads to decline of human albumin in uninfected mice, indicating the unwanted toxicity against uninfected cells at this dose. We reasoned that the mice still appeared fine because they still have intact mouse hepatocytes in their chimeric livers that were not targeted by the anti-human CD24 and that can support normal liver function.

This was confirmed by treating regular, immunocompetent mice (that do not harbor any human hepatocytes) with the same dose of anti-mouse CD24 at 8 mg/kg. This led to high level killing of mouse hepatocytes, indicated by rapidly rising ALT levels (see Table 3) and with overt clinical toxicity followed by death.

TABLE 3

Toxicity associated with high dose anti-mouse CD24 in regular mice.

| Mouse Strain | Antibody | Dose | ALT |
|---|---|---|---|
| BALB/c | CD24 (200 µg) | Daily (ONLY 4 days) | 222 U/L |
| | CD24 (200 µg) + CD47 (200 µg) | Daily (ONLY 4 days) | 358 U/L |

BALB/c mice were treated with the indicated amount of rat anti-mouse CD24, and the combination of rat anti-mouse CD24 and rat anti-mouse CD47 for certain time periods. Mouse behavior was scored and ALT at the end point was measured. When BALB/c mice were treated daily with 200 g (8 mg/kg) of rat anti-mouse CD24, or the combination of rat anti-mouse CD24 and rat anti-mouse CD47, for four days, mice became very sick and elevated ALT was found in the two treatment groups. We, therefore, discovered that anti-CD24 antibody at 8 mg/kg dose has unacceptable toxicity to the host.

We unexpectedly discovered, however, that lower doses of anti-mouse CD24 were better tolerated in such regular mice, and that at 25 µg (1m/kg) twice weekly, ALT levels remained normal, indicating the absence of killing of uninfected hepatocytes (see Table 4).

TABLE 4

| Mouse Strain | Antibody | Dose | ALT |
|---|---|---|---|
| BALB/c | CD24 (25 µg) | 2x/week | 29 U/L |
| | CD24 (25 µg) + CD47 (100 µg) | 2x/week | 30 U/L |

Low Dose Regimens of Anti-Mouse CD24 are Unexpectedly Well Tolerated in Regular Mice.

Mice were treated twice weekly with lower dose regimens (25 µg of rat anti-mouse CD24 or 25 µg of rat anti-mouse CD24 plus 100 µg of rat anti-mouse CD47). After two weeks of treatment, all mice appeared healthy and the ALT levels in these mice is comparable to that of the control mice (not shown), indicating the absence of hepatocyte toxicity.

When HBV-infected humanized mice were treated with low dose anti-human CD24 regimens, progressive loss of HBsAg was still observed, but now without fully eradicating the human albumin, indicating specific killing of infected hepatocytes, with a relative sparing of uninfected hepatocytes. (see Table 5).

TABLE 5

Efficacy and specificity for HBV-infected cells of low dose anti-human CD24 regimens.

| Mouse ID# | HBV Infection | Antibody | Frequency | Measurement | BaseLine | PTW 1 | PTW 2 | PTW 4 | PTW 6 | PTW 7 | PTW 12 |
|---|---|---|---|---|---|---|---|---|---|---|---|
| #562 | No | None | | hAlb | 2.66 | 5.48 | 4.41 | | | | |
| #563 | No | None | | hAlb | 2.58 | 3.63 | 2.85 | | | | |
| #571 | No | CD24 (25 µg) | 2x/week | hAlb | 4.52 | 5.26 | 5.21 | | | | |
| #567 | No | CD24 (25 µg) + CD47 (100 µg) | 2x/week | hAlb | 6.59 | 5.09 | 4.633 | | | | |
| #544 | Yes | None | | hAlb | 3.8 | 3.5 | 2.7 | | | | |
| | | | | HBsAg | 44 | 298 | 273 | | | | |
| #547 | Yes | CD24 (100 µg) | 2x/week | hAlb | 7.7 | 2.8 | N/A | | | | |
| | | | | HBsAg | 80 | 209 | N/A | | | | |
| #548 | Yes | CD24 (100 µg) + CD47 (100 µg) | 2x/week | hAlb | 7.9 | 1.4 | 10.55 | | | | |
| | | | | HBsAg | 86 | 183 | 16.7 | | | | |
| #553 | Yes | CD24 (25 µg) | 2x/week | hAlb | 1.09 | 0.467 | 0.072 | | | | |
| | | | | HBsAg | 145.72 | UD | UD | | | | |
| #554 | Yes | CD24 (25 µg) + CD47 (100 µg) | 2x/week | hAlb | 0.82 | UD | UD | | | | |
| | | | | HBsAg | 165.74 | UD | UD | | | | |
| #562A | Yes | CD24 (25 µg) | 1x/week | hAlb | 2.9 | 1.8 | 0.9 | 0.3 | | 0.14 | |
| | | | | HBsAg | 1387.3 | 759 | 295 | 38.3 | | UD | |
| #543 | Yes | CD24 (25 µg) | 1x/week | hhAlb | 0.89 | 0.55 | 0.49 | 0.19 | 0.2 | 0.15 | 0.17 |
| | | | | HBsAg | 85.5 | 32.43 | 13.54 | UD | UD | UD | UD |

TABLE 5-continued

Efficacy and specificity for HBV-infected cells of low dose anti-human CD24 regimens.

| Mouse ID# | HBV Infection | Antibody | Frequency | Measurement | BaseLine | PTW 1 | PTW 2 | PTW 4 | PTW 6 | PTW 7 | PTW 12 |
|---|---|---|---|---|---|---|---|---|---|---|---|
| #550 | Yes | CD24 (12.5 µg) | 1×/week | Alb | 0.8 | 0.45 | 0.44 | 0.17 | 0.16 | 0.16 | 0.15 |
| | | | | HBsAg | 63.02 | 26.27 | 8.35 | UD | UD | UD | UD |
| #567A | Yes | CD24 (6.25 µg) | 1×/week | hAlb | 2.6 | 2.7 | 1.7 | 0.75 | 0.36 | 10.20 | |
| | | | | HBsAg | 1149.7 | 1052.4 | 370.9 | 198 | 35.9 | UD | |
| #563A | HDV | CD24 (25 µg) | 1×/week | hAlb | 2.4 | 1.5 | 0.6 | 0.26 | 0.18 | 0.13 | |
| | | | | HBsAg | 321.5 | 119 | 37.4 | 17.1 | UD | UD | |
| | | | | HDV RNA | 6.7E4 | 6.3E5 | 7.9E4 | UD | UD | UD | |

Efficacy and Specificity for HBV-Infected Cells of Low Dose Anti-Human CD24 Regimens.

Chimeric mice with, or without, chronic HBV infection following inoculation with HBV-positive patient serum, were treated with the indicated antibodies at the different doses and frequency (shaded cells indicate treatment periods). HBV infection status is labeled as "Yes" (for chronic HBV infection) or "No" (for un-infected mice). "HDV" indicates that HBV chronically-infected chimeric mice were superinfected with HDV-positive patient serum. Human albumin (hAlb, mg/ml), HBsAg (ng/ml), and HDV RNA (copies/ml) in mouse serum were measured at the indicated time points. "UD" means undetectable.

Chimeric mice without HBV infection (#562 and #563) had sustained levels of human albumin over two weeks. Similarly, when chimeric mice without HBV infection (#567 and #571) were treated with mouse anti-human CD24 (25 µg or 1 mg/kg), or mouse anti-human CD24 plus anti-human CD47 (100 µg), for two weeks, there was no significant decrease in the human albumin level. These data demonstrate that the low dose mouse anti-human CD24 (25 µg or 1 mg/kg), or mouse anti-human CD24 plus anti-human CD47 (100 µg or 4 mg/kg), are safer doses for chimeric mice. Moreover, the chimeric mice chronically infected with HBV, without any antibody treatment (#544), maintained HBsAg over two weeks. In contrast, when chimeric mice (#547 and #548) were treated twice weekly with mouse anti-human CD24 (100 µg or 4 mg/kg), or mouse anti-human CD24 plus anti-human CD47 (100 µg or 4 mg/kg), over 2 weeks, significant decreases in human albumin were observed. Therefore, subsequent chimeric mice were treated with decreased antibody doses and frequency, e.g. 25 µg (1 mg/kg) (#562A and #543), 12.5 µg (0.5 mg/kg) (#550) and 6.25 µg (0.25 mg/kg) (#567A) per week for two weeks. At these doses, after just two weeks of treatment, HBsAg in HBV chronically infected chimeric mice was eradicated and remained undetectable after treatment. Furthermore, anti-human CD24 treatment eradicated HDV RNA as well as HBsAg in HDV-superinfected HBV chimeric mice (#563A).

These data demonstrate that low dose-based regimens can lead to significant reduction of HBsAg and HBV DNA that may be mediated in part via killing of HBV-infected cells in a more controlled and specific manner, which is ideal for treating HBV-infected patients. Because only a fraction of the total liver cell population in patients is infected with HBV, and because uninfected hepatocytes can expand to replace the HBV-infected hepatocytes that may be removed or killed by anti-human CD24, anti-human CD24 provides a novel and highly attractive, revolutionary treatment for chronic HBV infections. Desirable benefits include:

Rapid and controlled loss of HBsAg. This can help overcome the HBsAg-mediated immunosuppression of host anti-HBV immune responses, which will further contribute to control and eradication of HBV.

Killing and removal of HBV-infected hepatocytes. This clears out the most challenging problem of HBV infection, the integrated HBV genomes, which cannot be removed by current therapies. This can decrease the risk of cancer associated with HBV.

Very short treatment course. Only a few doses of anti-human CD24 is required to achieve the desired therapeutic outcome. This is in stark contrast to current anti-HBV therapy which must be taken for life, as it only suppresses HBV but cannot eradicate HBsAg or the HBV infection.

Very convenient dosing. Once a week, or potentially even less frequent, dosing of anti-human CD24 can achieve the desired anti-HBV effects. This is in contrast to current therapies that must be taken daily.

CD24 may also be elevated in cells infected with other viruses that cause chronic infections such as hepatitis C virus (HCV), hepatitis delta virus (HDV), human immunodeficiency virus (HIV), cytomegalovirus (CMV), human papilloma virus (HPV), and herpes simplex virus (HSV). Some of these chronic viral infections have a high association with subsequent cancer formation.

We tested the hypothesis that CD24 antibody will also have an anti-cancer effect. We selected HBV-infected cells with high CD47 expression that are known to form tumors in NSG mice within 6 weeks after subcutaneous flank injection. We pre-incubated each 1 million cells with 10 µg (20 µg/mouse or 0.8 mg/kg) of either anti-human CD24, anti-human CD15, anti-human CD47, combination of anti-human CD24 and anti-human CD15, combination of anti-human CD24 and anti-human CD15 and anti-human CD47, or IgG isotype control prior to subcutaneous flank injection. Pre-treatment with just 20 µg/mouse (0.8 mg/kg) of anti-human CD24 leads to complete inability of tumor formation (FIG. 1).

In addition to anti-viral and anti-cancer effects, therapeutics targeting CD24 and/or its immune cells' binding partner Siglec-10 may also have clinical benefits in conditions where CD24 is inappropriately elevated leading to ineffective elimination of pathologic cells by immune cells such as fibrosing diseases and atherosclerosis where immune cells are ineffective at removing diseased cells.

NSG mice lack functional B, T, and NK cells but still have functional macrophages. The antiviral effects observed in our humanized mice may be mediated in part through phagocytosis activity, as supported by in vitro phagocytosis assays carried out using a mouse macrophage cell line (RAW264.7) and the HepG2.2.1.5 cells (which harbors the HBV genome), where administering anti-CD24 antibody can enhance phagocytic clearance of HBV-infected cells.

We further determined whether antibodies targeting other surface markers elevated in HBV-infected cells can enhance the phagocytic clearance. Indeed, antibodies targeting CD15, CD47, CD104, CD133, CD257 show increased phagocytosis of HepG2.2.1.5 cells demonstrating that therapeutics targeting CD15, CD47, CD104, CD133, CD257 may be effective antivirals (FIG. 2). Even though anti-CD47 antibody did not show antiviral efficacy in our HBV-infected mice, that likely reflects inconsistent elevation of CD47 in HBV infected cells as shown by our 2.2.1.5 CD47H and CD47L populations. It is more likely, however, that anti-CD15, anti-CD104, anti-CD133, and anti-CD257 agents will have real anti-HBV therapeutic efficacy as those markers are elevated in both the 2.2.1.5 CD47H and CD47L cells Materials and Methods Antibody. Mouse anti-human CD24 (Clone #ML5 and #SWA11), rat anti-mouse CD24, were purchased from Biolegend (San Diego, CA) and Creative Biolab (Shirley, NY), respectively. Mouse anti-human CD47 (Clone #B6H12) was purchased from BD Bioscience (San Jose, CA).

Mice, BALB/c and NSG mice with background NOD.Cg-Prkdc$^{scid}$ Il2rg$^{tm1Wjl}$/SzJ (Cat #: 005557), were purchased from Jackson Laboratory Inc (Sacramento, CA, USA). All mice were housed in pathogen-free barrier facilities at the Stanford University Research Animal Facility and were fed with irradiated mouse chow and autoclaved water adlibitum. All animal procedures were performed under protocols approved by the Institutional Animal Care and Utilization Committee (IACUC) of Stanford University.

Humanized mice using RAAPID-TKG method. rAAV8-HSVtk ($4\times10^{13}$ vg/kg) were adjusted to 250 µl with saline solution and then inoculated into mice (~25 g) by tail vein intravenous injection. After two to three weeks of rAAV8-HSVtk administration, mice were treated with two doses of 5 mg/kg (murine body weight) of ganciclovir (GCV) (Cat #: 315110, APP Pharmaceuticals, Schauburg, IL), two days apart, to induce injury. The elevated alanine aminotransferase (ALT) activity in treated murine serum, an indicator of liver injury, was measured using Element DC veterinary Chemistry Analyzer (Cat #:6330-ALT, HESKA, Loveland, CO, USA). Mice with elevated ALT levels (>200 IU/L) were intrasplenically transplanted with cryopreserved human hepatocyte (Lot #TVR) which were purchased from BioIVT (Baltimore, MD, USA). After four weeks of post-transplantation, human albumin in murine serum was measured with Human Albumin ELISA Quantitation Kit (Cat #: E88-129, Bethyl Laboratories Inc., Montgomery, TX, USA) according to the manufacturer's protocol. The engraftment efficiency of human hepatocytes was estimated in vivo by the level of human albumin, and upon sacrifice by calculating the area occupied by human hepatocytes in sections of total liver, using Photoshop software 6.2 (Adobe, San Jose, CA, USA). Typically, six weeks post transplantation, chimeric mice were treated with hamster monoclonal anti-mouse CD95 antibody (200 µg/kg) weekly, an inducer of mouse hepatocyte-specific apoptosis, to maintain human albumin level.

HBV and HDV infection of chimeric mice. Chimeric mice with >2 mg/ml of human albumin in murine serum were used for hepatitis virus infections. All hepatitis virus infections were performed via intravenous tail vein injection. To establish chronic HBV infection, chimeric mice were injected with 100 µL of human serum from HBV-positive patients (Lot #S1072). After two to three weeks of HBV inoculation, HBV DNA copy number was measured by qPCR as described below, and HBsAg was measured with an HBsAg quantitative kit (Alpha Diagnostic Intl. inc, San Antonio, TX). In case of superinfection of hepatitis virus delta (HDV), HBV chronically infected mice with titer>$10^6$ IU of HBV DNA per ml, were superinfected with 50 µL of HDV-positive patient sera. After three weeks of superinfection, mouse serum was collected and HDV RNA in mouse sera was measured by RT-PCR as described below. For antivirus study, chronically HBV infected chimeric mice were treated with the various doses of mouse anti-human CD24 (Clone #ML5 or #SWA11) at the indicated time points. HBV DNA and HBsAg, as well as HDV RNA in the case of superinfection, were monitored.

Virological measurements. To determine HBV DNA copy numbers in murine serum, HBV DNA from murine serum samples (10 µl) were extracted using Zymo Viral DNA kit (Cat #: D3017, Zymo Research, Irvine, CA, USA) according to the manufacturer's instructions. At the same time, AcroMetrix HBV (Cat #: 965003, AcroMetrix, Benicia, CA, USA) standard controls were serially diluted in ten-fold increments, extracted, and run in parallel in HBV qPCR assays using the Bio-Rad CFX96 Real-Time System (Bio-Rad, Hercules, CA, USA). qPCR reaction conditions were performed as described, using SssoAdvanced Universal Probes Supermix (Cat #: 1725281, Bio-Rad, Hercules, CA, USA), and primers and probe, which were synthesized by Integrated DNA Technologies (Coralville, IA, USA). HBV Forward Primer: 5'-AGTGTGGATTCGCACTCCT-3', Reverse Primer: 5'-GAGTTCTTCTTCTAGGGGACCTG-3', Probe: 5' FAM-CCAAATGCCCCTATCTTAT-CAACACTTCC-IABFQ 3'. HDV viremia was quantified using the Bio-Rad QX200 Digital Droplet PCR system (Bio-Rad Labs, Hercules CA) in a two-step reaction. HDV RNA from murine serum (10 µl) and 10 fold serial diluted HDV-positive standard serum (10 µl) were isolated using the Zymo ZR Viral RNA Kit (Cat #: R1035, Zymo Research, Irvine CA, USA), respectively. Twenty microliters of eluted RNA was placed into a new PCR tube along with 1.25 µL of RNAse-OUT (Cat #: 10777-019, Thermofisher Scientific, Waltham MA), heated at 94° C. for 2 minutes, and then immediately frozen on dry ice. This step was crucial to relax the RNA and achieve optimal reverse transcription. After thawing on wet ice, RNA was combined with AccuPower RocketScript RT Premix (Cat #: K2104, Bioneer Corporation, South Korea) along with 50 fmol reverse primer (5'-GGTCGGCATGGCATCTCCA-3') with cycling reaction conditions as follows: 5 minutes at 30° C., 2 hours at 70° C., and 5 minutes at 95° C. ddPCR primer and probe sequences targeting highly conserved regions of the HDV genome, were synthesized by Integrated DNA Technologies (Coralville, IA, USA). Forward Primer: 5'-GGCWCTCCCT-TAGCCATCCG-3', Reverse Primer: 5'-GGTCGGCATGG-CATCTCCA-3', Probe: 5' FAM-CTCCTWCGGATGCCCAGGTCGGAC-IABFQ-3'.

Antibody Treatment for HBV chronically-infected chimeric mice. HBV chronically-infected chimeric mice were treated with the indicated IgG isotype control, mouse anti-human CD24, mouse anti-human CD47 or combination of mouse anti-human CD24 and CD47. Control chimeric mice, with and without HBV infection, were included as controls. At the indicated time points, human albumin (hAlb, mg/ml), HBV DNA (copies/ml) and HBsAg (ng/ml), and HDV RNA (copies/ml) in the case of superinfection, were measured. Baseline data indicates the initial value just before treatment. PTW data indicates the value after that week of treatment. If HBsAg is still detectable in chimeric mice after two weeks of treatment, the chimeric mice are further treated weekly with 25 µg of mouse anti-human CD24 for two more weeks.

Example 2

The safety, tolerability, and pharmacokinetics (PK) of anti-CD24 antibody is evaluated with an open-label and multidose study in healthy volunteers and HBV-infected patients.

Seven initial single-dosing groups are taken through stepwise and dose-escalation study, each having 6 participants. Dosing is 0.05, 0.1, 0.25 mg/kg, 0.5 mg/kg, 1 mg/kg, 2 mg/kg, and 3 mg/kg administered either IV or subcutaneously at weekly or other intervals as determined by pharmacokinetics observed in the single dose escalation study. All participants have weekly blood drawn to assess their CBC, CMP, and coagulation function up to 4 weeks after the administered dose.

Dose limiting toxicity (DLT) is defined as the lowest dose where 1/6 participants experiences adverse events (AEs) of level 3 or above related to the study drug occurring within 28 days after the administered dose as assessed by CTCAE v5.0.

The anti-CD24 antibody is then administered weekly for 4 weeks at the 3 highest dose groups below the DLT. All participants have weekly blood drawn to assess their CBC, CMP, and Coagulation function up to 4 weeks after the last administered dose. The maximal tolerated dose (MTD) is defined as the highest dose where 0/6 participants experiences AEs of level 3 or above.

This MTD is selected to evaluate the efficacy of anti-CD24 antibody in treating HBV patients.

All recruited patients with HBV meet the criteria for being treated with a nucleoside analog such as tenofovir disoproxil fumarate (DF), tenofovir alafenamide, or entecavir. All patients will have been on nucleoside analog therapy for at least 3 months and will continue their nucleoside analog during the duration of receiving anti-human CD24 antibody. HBV patients will be administered anti-CD24 antibody weekly for 4 weeks at MTD, 1/3 MTD, and 1/9 MTD. All participants will have weekly blood drawn to assess their CBC, CMP, Coag, HBV DNA, and quantitative HBV sAg.

Example 3

Monoclonal Antibodies Mediated Phagocytic Clearance of HBV Cell Line

In vitro phagocytosis of HBV infected cells is enhanced by blocking multiple cell surface molecules. Virus-infected cells were labeled and mixed with macrophages in the presence of control or blocking antibodies. HepG2.2.15 cells were labeled with mCherry (Red) by transduced with lentiviral vector containing mCherry gene under PGK promoter. Raw 264.7 cells were cultured in IMDM medium with 10% FBS, activated by 50 nM phorbol 12-myristate 13-acetate (PMA, Sigma-Aldrich) and 10 ng/ml of M-CSF. After two days of activation, Raw264.7 were detached and labeled with 0.1 mM of Calcein AM (Green) on 37° C. for 30 min. Both of the labeled HepG2.2.15 and Raw264.7 cells were mixed as ratio 1:10, seeded on 8-well chamber slides and quickly attached by low speed centrifuge for 5 min. Cells were then cultured in IMDM with 50 nM PMA and 10 ng/ml of pigment epithelium-derived factor (PEDF). The indicated antibody was added to each well to final concentration $10^{-20}$ μg/ml. After 24 hrs of coculture, cells were washed three times with PBS and mounted on antifade media containing DAPI. The images were captured with a KEYENCE BZ-X710 All-in-One Fluorescence Microscope (KEYENCE Corp. of USA, Itasca, IL, USA).

Shown in FIG. 2A-2F, are the results with the blocking or control antibodies A. IgG2a negative control. B. Anti-CD24. C. Anti-CD15. D. Anti-CD47. E. Anti-CD104. F. Anti-CD133. G. Anti-CD257.

The virus infected cells HepG2.2.15, were labeled with mCherry (Red). Macrophages, RAW264.7, were labeled with Calcein AM (green). Arrows indicate where in vitro phagocytosis of HepG2.2.1.5 cells by RAW 264.7 cells happens (detected by the presence of red spots—fragments of HepG2.2.1.5 cells—inside the green labeled RAW 264.7 cells) in the presence of different antibodies (anti-CD24, anti-CD15, anti-CD47, anti-CD104, anti-CD133, anti-CD257). No phagocytosis was observed in the presence of the IgG2a control antibodies.

These data indicate that there is a role, at least in vitro, for these blocking antibodies to increase phagocytosis of virus-infected cells. With respect to anti-CD24 antibodies specifically, it is surprisingly found that a dose that is efficacious as an anti-viral agent is lower than would be predicted based on in vitro phagocytosis results. The anti-viral dose was determined with the in vivo experiments shown in Example 1.

What is claimed is:

1. A method of reducing hepatitis virus in an individual, the method comprising:
    contacting the individual with a therapeutically effective dose of an antibody that specifically binds to CD24 and blocks binding activity of CD24 in a dose sufficient to kill hepatovirus infected cells without unacceptable toxicity, for a period of time sufficient to reduce the amount of hepatitis virus in the individual.

2. The method of claim 1, wherein the individual is a human and the anti-CD24 antibody specifically acts on human CD24.

3. The method of claim 1, wherein the therapeutically effective dose of the anti-CD24 antibody is less than 8 mg/kg administered over a 24 hour period, or over a 7 day period.

4. The method of claim 1, wherein the therapeutically effective dose of the anti-CD24 antibody is less than 1 mg/kg administered over a 24 hour period, or over a 7 day period.

5. The method of claim 1, wherein the period of time for treatment is from 1-24 weeks, 1-8 weeks, or 1-4 weeks.

6. The method of claim 1, wherein the anti-CD24 antibody is administered in combination with an agent that specifically targets a second antigen upregulated on virus-infected cells.

7. The method of claim 6, wherein the second antigen is selected from CD15, CD104, CD257, CD105, CD133 and CD47.

8. The method of claim 6, wherein the anti-CD24 antibody is a bispecific antibody that specifically binds to CD24 and to the second antigen upregulated on virus-infected cells.

9. The method of claim 1, wherein the anti-CD24 antibody is administered in combination with an agent that reduces reinfection of cells with the virus, optionally selected from entry inhibitor myrcludex-b, and a nucleoside analog including tenofovir disoproxil fumarate (DF), tenofovir alafenamide, and entecavir.

10. The method of claim 1, wherein the anti-CD24 antibody is administered in combination with a second antiviral agent, optionally selected from one or more of HBsAg release inhibitor, HBV core inhibitors, siRNAs targeting HBV (or HDV), an immunomodulator (including interferons), a prenylation inhibitor, RT or polymerase inhibitor, therapeutic vaccine.

11. The method of claim 1, wherein the hepatitis virus is selected from hepatitis B virus (HBV), hepatitis delta virus (HDV), and hepatitis C virus (HCV).

12. A method of reducing hepatitis B virus (HBV) in an individual, the method comprising:
contacting the individual with a therapeutically effective dose of an antibody that specifically binds to CD24 in a dose sufficient to kill HBV infected cells without unacceptable toxicity, for a period of time sufficient to reduce the amount of hepatovirus in the individual wherein HBV genome is reduced from the individual following treatment.

13. The method of claim 12, wherein one or more of: HBsAg is at a level less than 1 IU/ml or 1 ng/ml in blood (serum or plasma) of the individual following treatment.

14. The method of claim 1 where the anti-CD24 antibody is a humanized anti-CD24 antibody.

15. The method of claim 1, wherein the anti-CD24 antibody binds to the leucine-alanine-proline motif of CD24.

16. The method of claim 12, wherein HBV is present in the individual in combination with hepatitis D virus (HDV).

17. The method of claim 12, wherein HBsAg concentration in blood of the individual is reduced by at least 1 log following treatment relative to pre-treatment concentration.

18. The method of claim 12, wherein the individual achieves HBsAg seroconversion to anti-HBs positivity.

19. The method of claim 12, where HBV virus-driven cancer is treated in the individual.

* * * * *